US008880954B2

(12) United States Patent
Gebara et al.

(10) Patent No.: US 8,880,954 B2
(45) Date of Patent: Nov. 4, 2014

(54) TEMPERATURE-PROFILED DEVICE FINGERPRINT GENERATION AND AUTHENTICATION FROM POWER-UP STATES OF STATIC CELLS

(71) Applicant: International Business Machines Corporation, Armonk, NY (US)

(72) Inventors: Fadi H. Gebara, Austin, TX (US); Joonsoo Kim, Austin, TX (US); Jeremy D. Schaub, Austin, TX (US); Volker Strumpen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/859,038

(22) Filed: Apr. 9, 2013

(65) Prior Publication Data
US 2013/0247145 A1 Sep. 19, 2013

Related U.S. Application Data

(63) Continuation of application No. 13/483,252, filed on May 30, 2012, now Pat. No. 8,495,431, which is a continuation of application No. 12/146,997, filed on Jun. 26, 2008, now Pat. No. 8,219,857.

(51) Int. Cl.
G06F 11/00 (2006.01)
G06F 21/73 (2013.01)
G06F 21/44 (2013.01)
G11C 11/41 (2006.01)
G11C 29/50 (2006.01)
G11C 16/20 (2006.01)
G11C 29/44 (2006.01)

(52) U.S. Cl.
CPC .......... *G06F 21/73* (2013.01); *G11C 11/41* (2013.01); *G11C 2029/5002* (2013.01); *G11C 16/20* (2013.01); *G11C 2029/4402* (2013.01); *G11C 29/50* (2013.01); *G06F 21/44* (2013.01)
USPC ............................................. 714/42; 714/36

(58) Field of Classification Search
USPC ........................................ 714/42, 36
See application file for complete search history.

(56) References Cited

U.S. PATENT DOCUMENTS

| 5,174,920 | A | 12/1992 | Iijima |
| 6,414,508 | B1 * | 7/2002 | London .................. 324/762.05 |
| 6,603,321 | B2 | 8/2003 | Filippi et al. |
| 6,738,294 | B2 * | 5/2004 | Layman et al. ........ 365/189.011 |
| 7,216,272 | B2 * | 5/2007 | Loh ............................. 714/721 |
| 7,715,255 | B2 | 5/2010 | Tu et al. |
| 8,219,857 | B2 * | 7/2012 | Gebara et al. ............... 714/42 |
| 8,495,431 | B2 * | 7/2013 | Gebara et al. ............... 714/42 |
| 2002/0159312 | A1 | 10/2002 | Kasai et al. |
| 2003/0074173 | A1 | 4/2003 | Monroe |
| 2003/0122236 | A1 | 7/2003 | Nam et al. |
| 2003/0153105 | A1 | 8/2003 | Burch |
| 2003/0205737 | A1 | 11/2003 | Fenner et al. |
| 2004/0062084 | A1 * | 4/2004 | Layman et al. .......... 365/189.01 |
| 2004/0102914 | A1 | 5/2004 | More |
| 2005/0039098 | A1 * | 2/2005 | Camarota ................... 714/733 |
| 2006/0050580 | A1 * | 3/2006 | Yamaguchi et al. .......... 365/201 |
| 2007/0022288 | A1 | 1/2007 | Teglia et al. |
| 2007/0188188 | A1 | 8/2007 | Or-Bach et al. |
| 2008/0065937 | A1 | 3/2008 | Micheloni et al. |
| 2008/0066890 | A1 | 3/2008 | Searls et al. |
| 2008/0129371 | A1 | 6/2008 | Hartmann et al. |
| 2008/0247252 | A1 | 10/2008 | Ruf et al. |
| 2009/0021085 | A1 * | 1/2009 | Arsovski et al. .............. 307/117 |
| 2009/0030994 | A1 * | 1/2009 | Usher .......................... 709/206 |
| 2009/0116312 | A1 | 5/2009 | Carpenter et al. |
| 2009/0315617 | A1 | 12/2009 | Rosik et al. |
| 2012/0246494 | A1 | 9/2012 | Gebara et al. |

OTHER PUBLICATIONS

Holcomb, "Randomness in Integrated Circuits with Applications in Device Identification and Random Number Generation" Master's thesis, Department of Electrical and Computer Engineering, University of Massachusetts Amherst, Aug. 2007, 56 pages (pp. 1-56 in pdf), US.

Notice of Allowance in U.S. Appl. No. 12/146,997 mailed on Mar. 2, 2012, 9 pages (pp. 1-9 in pdf).

Notice of Allowance in U.S. Appl. No. 13/483,252 mailed on Mar. 20, 2013, 10 pages (pp. 1-10 in pdf).

Babai, et al. "Randomized Simultaneous Messages: Solution of a Problem of Yao in Communication Complexity", 12th IEEE Conference on Computational Complexity, 1997, pp. 239-246, Washington, DC.

Bookstein, et al., "Generalized Hamming Distance" Information Retrieval, vol. 5, No. 4, 2002, pp. 353-375, Springer, Netherlands.

Broder, "Identifying and Filtering Near-Duplicate Documents", Combinatorial Pattern Matching in Lecture Notes in Computer Science 1848, 2000, pp. 1-10, Springer, Berlin.

(Continued)

*Primary Examiner* — Loan L. T. Truong
(74) *Attorney, Agent, or Firm* — Mitch Harris, Atty at Law, LLC; Andrew M. Harris; William J. Stock

(57) ABSTRACT

A method, system and computer program product for generating device fingerprints and authenticating devices uses initial states of internal storage cells after each of a number multiple power cycles for each of a number of device temperatures to generate a device fingerprint. The device fingerprint may include pairs of expected values for each of the internal storage cells and a corresponding probability that the storage cell will assume the expected value. Storage cells that have expected values varying over the multiple temperatures may be excluded from the fingerprint. A device is authenticated by a similarity algorithm that uses a match of the expected values from a known fingerprint with power-up values from an unknown device, weighting the comparisons by the probability for each cell to compute a similarity measure.

9 Claims, 20 Drawing Sheets

(56) References Cited

OTHER PUBLICATIONS

Chávez, et al., "Searching in Metric Spaces", ACM Computing Surveys, vol. 33, No. 3, 2001, pp. 272-321, NY.

Gassend, et al., "Silicon Physical Random Functions", 9th ACM Conference on Computer and Communications Security, Nov. 2002, pp. 148-160, Washington, DC.

Gibson, et al., "Discovering Large Dense Subgraphs in Massive Graphs", Proceedings of the 31st International Conference on Very Large Data Bases, 2005 pp. 721-732, ACM, Norway.

Guajardo, et al., "FPGA Intrinsic PUFs and Their Use for IP Protection", Cryptographic Hardware and Embedded Systems in Lecture Notes in Computer Science 4727, pp. 63-80, 2007, Vienna, Austria.

Hirase, et al., "Chip Identification using the Characteristic Dispersion of Transistor", 14th Asian Test Symposium, pp. 188-193, 2005, IEEE Computer Society, Calcutta, India.

Holcomb, "Randomness in Integrated Circuits with Applications in Device Identification and Random Number Generation" Master's thesis, Department of Electrical and Computer Engineering, University of Massachusetts Amherst, 2007.

Lofstrom, et al. "IC Identification Circuit using Device Mismatch", 2000 IEEE International Solid-State Circuits Conference, 2000, pp. 372-373, San Francisco, CA.

Maeda, et al. "An Artificial Fingerprint Device (AFD): A Study of Identification Number Applications Utilizing Characteristics Variation of Polycrystalline Silicon TFTs", IEEE Transactions on Electron Devices, vol. 50 No. 6, 2003, 1451-1458.

Orshansky, et al., "Design for Manufacturability and Statistical Design: A Constructive Approach", 2007, pp. 27-32 and 190-199 Springer Verlag, NY.

Roy, et al., "EPIC: Ending Piracy of Integrated Circuits", Design, Automation and Test in Europe, pp. 1069-1074, 2008, Munich, Germany.

Su, et al. "A Digital 1.6 pJ/bit Chip Identification Circuit Using Process Variations", IEEE Journal of Solid-State Circuits, vol. 43, No. 1, pp. 69-77, 2008, IEEE Press, NY.

Suh, et al., "Physical Unclonable Functions for Device Authentication and Secret Key Generation", 44th Annual Conference on Design Automation, pp. 9-14, 2007, ACM Press, San Diego, CA.

Tokunaga, et al., "True Random Number Generator with a Metastability-Based Quality Control", 2007 *IEEE International Solid-State Circuits Conference*, pp. 404-405, 2007, IEEE Press, San Francisco, CA.

Willett, "Similarity-based Approaches to Virtual Screening" *Biochemical Society Transactions* vol. 31 pp. 603-606, 2003, London, UK.

Notice of Allowance in U.S. Appl. No. 12/146,997 mailed on Mar. 2, 2012.

Notice of Allowance in U.S. Appl. No. 13/483,252 mailed on Mar. 20, 2013.

\* cited by examiner

| die | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | | | | | | | | | | | | | | |
| 2 | 1917 | 0 | | | | | | | | | | | | | |
| 3 | 1927 | 1986 | 0 | | | | | | | | | | | | |
| 4 | 1856 | 1957 | 1857 | 0 | | | | | | | | | | | |
| 5 | 1962 | 1977 | 2073 | 2024 | 0 | | | | | | | | | | |
| 6 | 2047 | 1946 | 2018 | 2031 | 1929 | 0 | | | | | | | | | |
| 7 | 2067 | 1994 | 2050 | 1995 | 2035 | 2022 | 0 | | | | | | | | |
| 8 | 2044 | 2051 | 1981 | 1942 | 1996 | 1985 | 2063 | 0 | | | | | | | |
| 9 | 1898 | 1919 | 1979 | 1924 | 2052 | 1949 | 2041 | 2004 | 0 | | | | | | |
| 10 | 2036 | 1985 | 2045 | 2046 | 2056 | 2033 | 2051 | 1994 | 2080 | 0 | | | | | |
| 11 | 2040 | 2021 | 1991 | 1974 | 2070 | 2033 | 1997 | 1980 | 1984 | 2052 | 0 | | | | |
| 12 | 1977 | 1992 | 1980 | 1979 | 2065 | 1952 | 2020 | 1957 | 1959 | 2011 | 2031 | 0 | | | |
| 13 | 1910 | 2011 | 1953 | 1932 | 2014 | 1985 | 1981 | 2000 | 1990 | 2018 | 1994 | 1937 | 0 | | |
| 14 | 1974 | 1973 | 1933 | 1854 | 1982 | 1931 | 2015 | 1982 | 1942 | 1978 | 2052 | 1987 | 1962 | 0 | |
| 15 | 1998 | 1915 | 1991 | 1910 | 2028 | 1973 | 1981 | 1896 | 1896 | 2048 | 1984 | 1983 | 1926 | 1872 | 0 |
| 16 | 1958 | 1967 | 2021 | 1916 | 1970 | 1935 | 1951 | 2016 | 1976 | 2048 | 2008 | 2039 | 1952 | 1940 | 1898 |
| 17 | 2025 | 2052 | 2058 | 2011 | 1975 | 2024 | 2064 | 1967 | 2007 | 2035 | 2013 | 1954 | 2063 | 2025 | 1951 |
| 18 | 1978 | 2021 | 2051 | 1960 | 2018 | 2071 | 1973 | 2106 | 1980 | 2162 | 2088 | 2079 | 2074 | 2020 | 1996 |
| 19 | 1996 | 2077 | 1965 | 1954 | 2002 | 1953 | 2059 | 2030 | 1954 | 2026 | 2026 | 1991 | 1960 | 1944 | 1986 |
| 20 | 1954 | 1917 | 1911 | 1942 | 2038 | 2031 | 1929 | 2010 | 1922 | 2042 | 2008 | 2013 | 2018 | 1972 | 1920 |
| 21 | 2032 | 1987 | 1989 | 1994 | 2012 | 1999 | 1977 | 2024 | 1986 | 2072 | 2022 | 2017 | 1970 | 2002 | 1912 |
| 22 | 1911 | 1874 | 1986 | 1875 | 1979 | 1950 | 2006 | 1971 | 1925 | 2081 | 1989 | 1988 | 1907 | 1889 | 1793 |
| 23 | 1893 | 2012 | 1938 | 1799 | 2019 | 1990 | 1942 | 1961 | 1903 | 2025 | 1983 | 2008 | 1975 | 1889 | 1917 |
| 24 | 1952 | 1979 | 1905 | 1896 | 2012 | 1935 | 1993 | 2058 | 1926 | 2046 | 1996 | 1965 | 1976 | 1912 | 1900 |
| 25 | 1839 | 1950 | 1962 | 1841 | 2061 | 1986 | 1958 | 1957 | 2013 | 2015 | 2027 | 1990 | 1809 | 1871 | 1881 |
| 26 | 2037 | 2026 | 1994 | 1897 | 2065 | 2018 | 2030 | 1977 | 2025 | 1973 | 2001 | 1990 | 1911 | 2019 | 1989 |
| 27 | 1970 | 2111 | 2015 | 1936 | 2036 | 1985 | 2003 | 2062 | 1998 | 2024 | 1974 | 2025 | 1984 | 1976 | 1940 |
| 28 | 1990 | 2003 | 1921 | 1838 | 1980 | 2031 | 2059 | 1984 | 1946 | 2058 | 1966 | 1963 | 1950 | 1946 | 1944 |
| 29 | 2022 | 2051 | 2003 | 2038 | 2014 | 2027 | 1989 | 2050 | 2014 | 2084 | 2058 | 2045 | 2002 | 1964 | 1984 |
| 30 | 1963 | 1940 | 1954 | 1895 | 2055 | 1918 | 1978 | 1993 | 1893 | 1971 | 1973 | 1998 | 1941 | 1835 | 1883 |
| 31 | 1957 | 1992 | 1864 | 1949 | 1995 | 2032 | 2008 | 1971 | 1981 | 2069 | 1979 | 2038 | 1901 | 1991 | 1919 |
| 32 | 1926 | 1947 | 1929 | 1820 | 1966 | 1911 | 2009 | 1982 | 1914 | 1946 | 2020 | 1913 | 1904 | 1892 | 1838 |

Fig. 5A

| die | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| 1 | | | | | | | | | | | | | | | | | |
| 2 | | | | | | | | | | | | | | | | | |
| 3 | | | | | | | | | | | | | | | | | |
| 4 | | | | | | | | | | | | | | | | | |
| 5 | | | | | | | | | | | | | | | | | |
| 6 | | | | | | | | | | | | | | | | | |
| 7 | | | | | | | | | | | | | | | | | |
| 8 | | | | | | | | | | | | | | | | | |
| 9 | | | | | | | | | | | | | | | | | |
| 10 | | | | | | | | | | | | | | | | | |
| 11 | | | | | | | | | | | | | | | | | |
| 12 | | | | | | | | | | | | | | | | | |
| 13 | | | | | | | | | | | | | | | | | |
| 14 | | | | | | | | | | | | | | | | | |
| 15 | | | | | | | | | | | | | | | | | |
| 16 | 0 | | | | | | | | | | | | | | | | |
| 17 | 2035 | 0 | | | | | | | | | | | | | | | |
| 18 | 1994 | 2025 | 0 | | | | | | | | | | | | | | |
| 19 | 1986 | 2017 | 2002 | 0 | | | | | | | | | | | | | |
| 20 | 1916 | 1989 | 1998 | 2018 | 0 | | | | | | | | | | | | |
| 21 | 1986 | 2013 | 2018 | 2018 | 2014 | 0 | | | | | | | | | | | |
| 22 | 1971 | 1962 | 2081 | 2027 | 1893 | 1957 | 0 | | | | | | | | | | |
| 23 | 1913 | 2014 | 1993 | 2003 | 1937 | 2001 | 1858 | 0 | | | | | | | | | |
| 24 | 1988 | 2055 | 1990 | 1958 | 1972 | 2004 | 1941 | 1847 | 0 | | | | | | | | |
| 25 | 1885 | 1964 | 1991 | 1931 | 1951 | 1921 | 1898 | 1866 | 1941 | 0 | | | | | | | |
| 26 | 1969 | 1990 | 1987 | 2033 | 2007 | 1997 | 1998 | 1932 | 2049 | 1994 | 0 | | | | | | |
| 27 | 1912 | 2061 | 1988 | 1978 | 2054 | 1964 | 2007 | 1939 | 1992 | 1965 | 2067 | 0 | | | | | |
| 28 | 1966 | 1987 | 2032 | 2050 | 1948 | 1964 | 1929 | 1919 | 1986 | 1957 | 1981 | 2032 | 0 | | | | |
| 29 | 2050 | 2043 | 2056 | 2018 | 2074 | 2026 | 1971 | 1959 | 2084 | 2011 | 2081 | 1994 | 2046 | 0 | | | |
| 30 | 1937 | 2036 | 2043 | 1993 | 2007 | 1943 | 1904 | 1846 | 1889 | 1942 | 1994 | 1971 | 1949 | 2047 | 0 | | |
| 31 | 1975 | 1976 | 1955 | 1945 | 1947 | 2009 | 1936 | 1876 | 1905 | 1898 | 1942 | 2005 | 1955 | 1991 | 1962 | 0 | |
| 32 | 1800 | 2017 | 2026 | 1932 | 1986 | 1990 | 1931 | 1921 | 1874 | 1915 | 1981 | 1998 | 1902 | 2002 | 1899 | 1851 | 0 |

TEMPERATURE-PROFILED DEVICE FINGERPRINT GENERATION AND AUTHENTICATION FROM POWER-UP STATES OF STATIC CELLS

This U.S. patent application is a Continuation of U.S. patent application Ser. No. 13/483,252, filed on May 30, 2012, which is a Continuation of Ser. No. 12/146,997, filed on Jun. 26, 2008 and issued as U.S. Pat. No. 8,219,857 on Jul. 10, 2012, and claims priority thereto under 35 U.S.C. §120.

BACKGROUND OF THE INVENTION

1. Field of the Invention

The present invention is related to device identification technologies for security, general identification and protection of intellectual property (IP) in electronic systems.

2. Description of Related Art

Reliable and secure identification methods for integrated circuits are increasingly desirable, in part, to mitigate a burgeoning problem of piracy of intellectual property and related trends including unauthorized code execution. The shrinking of feature sizes of semiconductor devices by technology scaling has reached the point where process variation is becoming a limiting constraint on the fabrication process. Techniques for proving copying have included placing physical identifiers, such as microscopic logos, text, and even holograms in or on a die. Such mechanisms do not provide ready identification from electronic means. Techniques for securing electronic systems typically use non-volatile storage for storing security keys and the like for use in validating that a proper device or subsystem is authentic. However, such techniques require additional circuitry that is subject to electronic intrusion techniques that once effective, can provide for duplication of the security keys.

While perceived as a problem for reliable manufacturing, process variation can be exploited in various ways for the identification of individual devices. Existing device identification strategies have used power-up values of SRAM cells to perform device identification, and developments in the area have typically focused on coping with the unreliability of using the initial power-up state of SRAM cells as a device identification tool. In particular, when collecting state data after successive power-cycles, some of the cells of a SRAM array assume the same value after every power-cycle, while others do not. Cells with a reliable power-up value are considered stable cells and those without a reliable power-up value are considered unstable cells. Existing identification methods take the supposedly probabilistic behavior of the SRAM cell power-up state into account, typically by performing multiple power-up state evaluations to determine the expected power-up values according to the law of large numbers. In some techniques, SRAM power-up values are used for random number generation.

A SRAM fingerprint is a bit string that may be determined from multiple power-cycle SRAM state evaluations. During each evaluation, each SRAM cell assumes a power-up state value, either 0 or 1. Table I illustrates the process of determining an SRAM fingerprint for an SRAM with 6 bits in positions [b0:b5] based on 8 power-up state evaluations. In the example illustrated by Table I, Bits 1, 3, and 4 are stable in that their power-up value is the same for each evaluation. In contrast, bits 0, 2, and 5 are unstable because they assume different power-up values. A simple and typical choice for generating an SRAM fingerprint is to include the unique power-up values of the stable bits, and for the unstable bits to choose the power-up value that occurs in the majority of all experiments. If both values 0 and 1 occur equally often, either value may be used, and the value used in the fingerprint may be selected randomly. For example, value 1 may be chosen for the expected value of bit 5 in the SRAM fingerprint illustrated in Table I.

TABLE I

| power-up experiment | power-up values | | | | | |
|---|---|---|---|---|---|---|
| | 0 | 1 | 2 | 3 | 4 | 5 |
| 1 | 0 | 1 | 1 | 0 | 1 | 0 |
| 2 | 0 | 1 | 0 | 0 | 1 | 1 |
| 3 | 0 | 1 | 1 | 0 | 1 | 0 |
| 4 | 0 | 1 | 1 | 0 | 1 | 1 |
| 5 | 1 | 1 | 1 | 0 | 1 | 0 |
| 6 | 0 | 1 | 0 | 0 | 1 | 1 |
| 7 | 0 | 1 | 1 | 0 | 1 | 0 |
| 8 | 0 | 1 | 1 | 0 | 1 | 1 |
| fingerprint | 0 | 1 | 1 | 0 | 1 | 1 |

Once the SRAM fingerprint is obtained, for example during manufacturing testing of a device, the fingerprint can be later used in challenges that validate the unique identity of the device, by performing field evaluations that typically repeat the power-up state evaluations to match an expected fingerprint with the states assumed by an SRAM device after multiple power cycles. However, the nature of the probabilistic models assumed in the existing techniques limits the reliability of such identification/validation techniques, which can require large amounts of data and still be subject to error.

Therefore, it would be desirable to provide a method, system and computer program product for generating a reliable fingerprint from a device having static storage cells from power-up state evaluations. It would further be desirable to provide a reliable matching criteria that provides a high level of validation confidence in identifying whether or not a particular device matches a given fingerprint.

BRIEF SUMMARY OF THE INVENTION

The above objectives of generating a reliable fingerprint that provides reliable and secure device identification based upon power-up static cell values, is accomplished in a computer performed method, and workstation computer, which may be a computer-controlled test system. The method is a method of operation of the computer system, which may be at least partially embodied in a computer program product including program instructions stored in computer-readable storage media for execution in a workstation computer system.

The computer system and method receive measurement data indicative of power-up states of static storage cells in a device, which may be obtained at wafer-level or device-level testing, or alternatively from a device via an interface at any time, such as from a scan chain or bus interface, e.g., a memory device may be "read" via its primary data interface to obtain the power-up values/states. A unique device identifier is generated from the power-up state data. The states of the static storage cells are collected after multiple power cycles to form sets of power-up states. The sets are collected for multiple temperatures, and optionally multiple power supply voltages, to form a collection of sets of power-up states. The state data are reduced by computing expected values for the state of each cell, and may be further reduced by merging the data for the multiple temperature ranges. The identifier may be generated as a bit string having fields corresponding to pairs of values for each cell: 1) the expected power-up value of the cell; and 2) the probability that the power-up value of the cell will assume the expected value. Data for cells having expected values that change over temperature may be excluded from the identifier, by including static values in fields of the identifier corresponding to the cells that vary, so that those cells can be excluded from subsequent authentication.

The device can later be authenticated using a distance function that compares a single initial power-up data set for the device to the previously-computed identifier. The distance function compares the states in the single data set to the expected values in the identifier. For expected values that match the corresponding single data set value, a total is incremented according to the corresponding probability stored in the identifier. For cells that differ, the total is decremented by the probability. The total is then divided by the number of contributing cells, and the result is then compared to a threshold value to decide whether or not the device is authentic.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIGS. 5A and 5B are a table showing Hamming distances for device fingerprints for pairs of die within a set of 32 die.

FIG. 7 is a table showing Hamming distances for pairs of temperature-voltage conditions for a single die.

DETAILED DESCRIPTION OF THE INVENTION

The present invention relates identification/authentication techniques for electronic devices. Given a sufficient number of static storage cells within a device, e.g., SRAM cells, latches, flip-flops, etc., a "fingerprint" can be generated that uniquely identifies the device from power-up initial values of the static storage cells. The signatures are generally determined at time of manufacture, as in the present invention, the fingerprint is made substantially temperature invariant by collecting power-up state data at multiple environmental temperatures for a sufficiently large number of power cycles at each of the temperatures. The fingerprint is generated from the collected data so that the device can be subsequently identified from a single power-up state set, although multiple power-up state sets can be collected to enhance the verification success rate. Temperature insensitivity of the fingerprint is ensured by excluding static storage cells for which the expected value of the power-up state varies with temperature, which can be accomplished by inserting a don't-care indication (e.g., a particular static value) in fields of the fingerprint that correspond to the cells with temperature-varying static values. Alternatively, multiple fingerprints (or a fingerprint encoding expected values for each temperature) can be provided and used in a sequential matching process that identifies a device by trying different fingerprints corresponding to different temperatures. The power supply voltage supplied to the device can also be studied and used to generate a fingerprint that is more accurate for devices having expected value variation with power supply voltage.

Figure 1A:
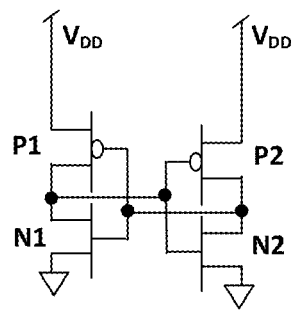
FIG. 1A is an electrical schematic of a static storage cell that may be used to provide power-up state information used in embodiments of the present invention.

Referring now to FIG. 1A, an SRAM cell is shown that exemplifies static storage cells that can provide power-up state data used by embodiments of the present invention to generate a fingerprint. Transistors N1 and P1 form a first inverter and transistors N2 and P2 form a second inverter. The inverters are cross-coupled to form a static storage latch, which can then be connected to pass gates to form SRAM elements, or to other logic circuits to provide latch storage, flip-flop functionality, etc. Further, the SRAM cell illustrated in FIG. 1A is only exemplary and it is understood that the techniques of the present invention may be applied to devices having a different type (or multiple types) of static storage element. As long as the static storage elements exhibit varying power-up values on different die due to process variation, the statistical behavior of their power-up states can be used to generate a fingerprint, so that the device can later be authenticated.

Figure 1B:
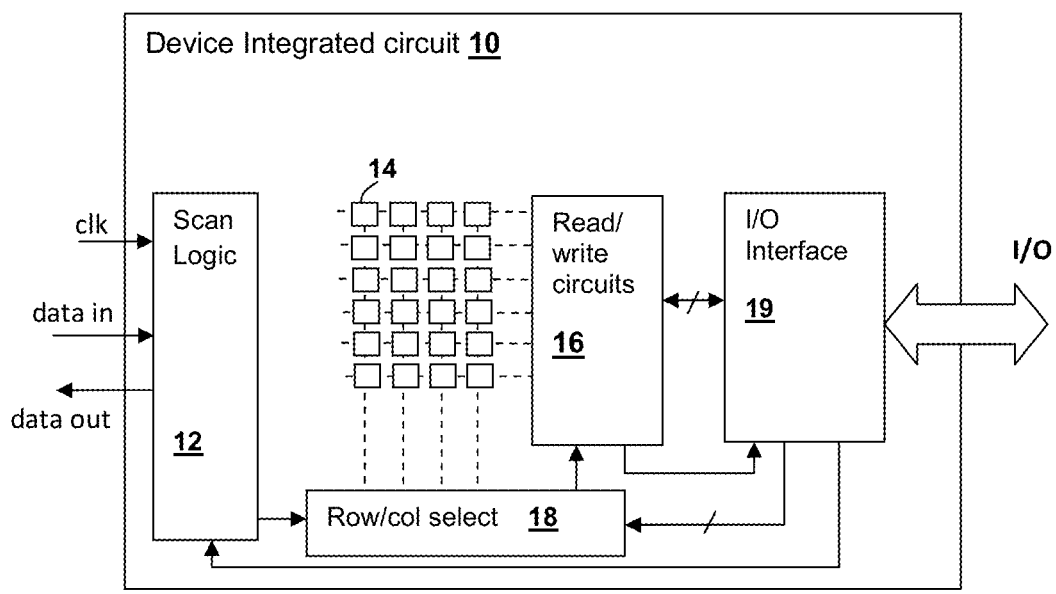
FIG. 1B is a block diagram depicting an integrated circuit that may be identified by techniques in accordance with embodiments of the present invention.

Referring now to FIG. 1B, a device integrated circuit 10 is shown that may be fingerprinted and identified/authenticated by techniques according to the present invention. Integrated circuit 10 includes SRAM storage elements 14, which assume various initial states when power supply voltage is applied to integrated circuit 10. Integrated circuit 10 also includes scan logic 12 that is coupled to various functional units of integrated circuit 10, including read/write circuits 16, I/O interface 19 and row/column select (address) circuits 18. There are two mechanisms available for reading the initial states of SRAM storage elements 14. The first mechanism is via scan logic 12, and is most amenable to reading the power-up states at wafer-level test, since probing test pads and test system interfaces that connect to scan logic 12 are typically available for other purposes, including device pass/fail testing. The second mechanism is via I/O interface 19, which provides for the connection of integrated circuit 10 to other devices in a system into which integrated circuit 10 is installed. For example, integrated circuit 10 may form an SRAM device, e.g., a cache memory for use in a computer system, and I/O interface 19 may be the bus interface that connects integrated circuit 10 to a local processor bus. When I/O interface 19 is accessible, power-up state values of SRAM storage elements 14 may be read directly by a processor via I/O interface 19 to obtain the initial power-up states used to identify/authenticate integrated circuit 10. If integrated circuit 10 is the processor, and SRAM storage elements 14 form part of a cache memory, then I/O interface 19 may be an internal connection to a processor core. However, in other embodiments, scan logic 12 may also be the mechanism used to identify/authenticate integrated circuit 10, as in embodiments where the values of SRAM storage elements 10 are static latches not accessible via another interface. Also, I/O interface 19 may be the mechanism for obtaining the multiple power-up state data sets used to compute the fingerprint for integrated circuit 10, as in embodiments in which the fingerprint is obtained in the field or after singulation and encapsulation of a die on which integrated circuit 10 is formed.

Figure 2:
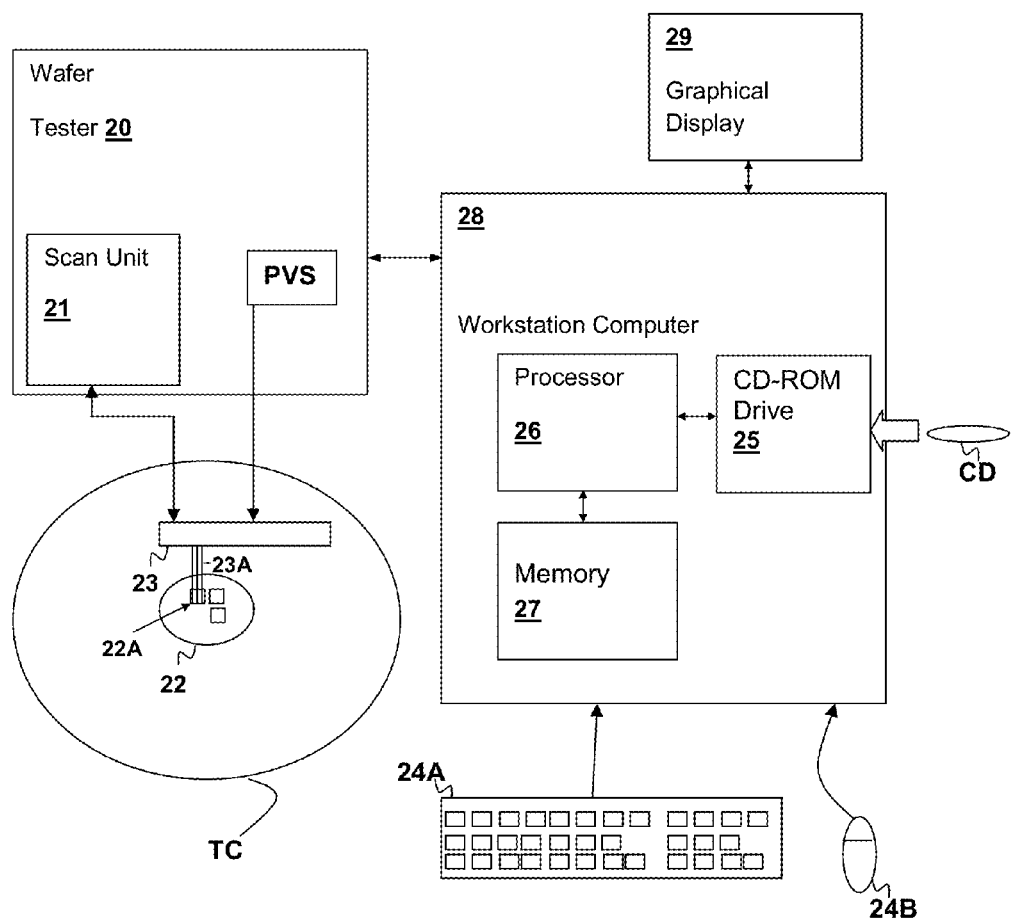
FIG. 2 is a pictorial diagram of a wafer test system in which methods in accordance with an embodiment of the present invention are performed.

Referring now to FIG. 2, a test system that may be used to obtain power-up state information from static storage cells within an integrated circuit and compute a fingerprint for the integrated circuit in accordance with techniques of the present invention is shown. A wafer tester 20 is coupled to a workstation computer system that includes a processor 26 coupled to a memory 27. Memory 27 stores program instructions and data, including program instructions for carrying out methods according to the present invention, which may be loaded into memory 27 from a fixed media such as CD-ROM CD via CD-ROM drive 25. A graphical display 29 is coupled to workstation computer system 28 for displaying results according to any of the computations described hereinafter, and to provide a user interface for input of control information to operate computer programs in accordance with embodiments of the present invention. Input devices, such as keyboard 24A and pointing device 24B are also coupled to workstation computer system 28 to provide for input of user commands. Wafer tester 20 includes a scan unit 21 that provides control information to, and receives data (including the power-up state data used by the present invention) from one or more die 22A integrated on a wafer 22 via test probe connections 23A to a test head 23. Wafer tester 20 also includes a programmable voltage supply PVS that is used to cycle power supply voltage (s) supplied to die 22A and to vary the power supply voltage in accordance with the techniques described below. A temperature chamber TC is provided to control the temperature of wafer 22 so that the power-up states of static storage elements integrated on die 22A can be studied for multiple environmental temperatures of die 22A.

The power-up behavior of SRAM cells exposes more information, when temperature dependencies are taken into account, than the probabilistic behavior assumed by previous techniques. The present invention expoits temperature variation information to provide a method for device identification that is reliable across a wide range of supply voltages and environmental temperature conditions. Below, in the Section labeled "Empirical Analysis", experimental data are presented and analyzed that are based on more than 300,000 power-cycle experiments of 43 die with SRAM memories for 6 different supply voltages and at 6 different temperatures. The probabilistic model of fingerprints in the section below labeled "Probabilistic Fingerprint Model" provides the foundation for an embodiment of the present invention that is presented in the section below labeled "Practical Fingerprinting Method."

Empirical Analysis

Measurements were performed on one wafer with 43 die, each with a 4,096-bit SRAM in 65 nm bulk technology. A temperature controlled probe-station was used to perform power-cycle experiments at temperatures (in degrees Centigrade):

$T=\{25,50,75,100,125,150\}$.

For each temperature T∈T, 200 power-cycle experiments were performed for each of supply voltages $V_{dd}=\{0.4V,0.6V,0.8V,1.0V,1.2V,1.4V\}$, by raising the power supply voltage $V_{dd}$ rapidly to the specified value, providing an approximately 1 microsecond settling time for internal device states, and then adjusting power supply voltage $V_{dd}$ to a nominal value of 1V before reading the bit-string of 4,096 power-up values from the static storage cells within the device. In the experimental setup, systematic errors that led to invalid test results were removed by discarding some of the data (e.g., data sets that yielded predominately one value and data sets in which the bit-strings were obviously shifted due to scan chain error). As a result, 81,045 power-up bit-strings were retained for 32 die, or a total of 1,024 data sets for a subset of (die×$V_{dd}$×T) rather than (die× $V_{dd}$×T)=32·6·6=1,152 data sets.

Distribution of Power-Up Values

Figure 3:
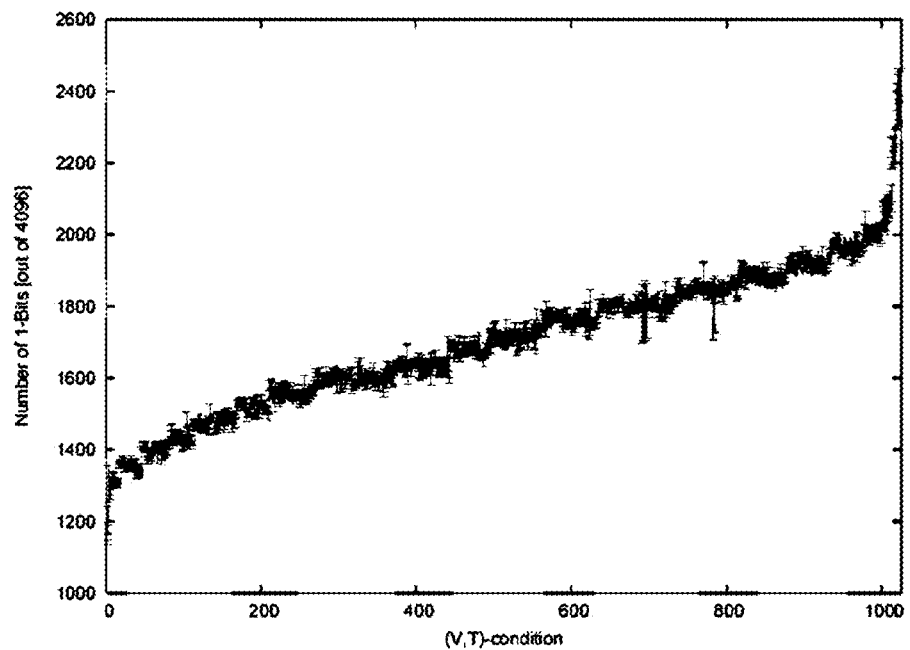
FIG. 3 is a graph depicting variation of power-up state data with voltage and temperature conditions.

Each power-up bit-string in the tests described above consisted of 4,096 binary values. If the power-up values were uniformly random distributed, an equal number of 0 values and 1 values would be expected, i.e., a count of 2048 of each value. Referring now to FIG. 3, a graph of the number of 1's is shown using a series of error-bars that bound the minimum and maximum number of 1's of the bit-strings for each ($V_{dd}$, T)-condition. The ($V_{dd}$,T)-conditions are sorted in ascending order of the mean number of 1's. From the Figure, it can be observed that: 1) the standard deviation of the number of 1's per ($V_{dd}$,T)-condition is relatively small; and (2) that the average number of 1's varies substantially, by 32% of the bit-string length 4,096, across the ($V_{dd}$,T)-conditions. Furthermore, the overall mean number of 1's is only 1,702, or 41.5% of the bit-string length, which appears to be due to process gradients.

Autocorrelation and Independence

The results for the distribution of 0's and 1's in the power-up bit-strings suggest that the power-up values might not be uniformly random distributed. We investigate the independence of the power-up events of individual bits in the bit-strings by computing autocorrelations, a standard procedure in signal processing. The autocorrelation coefficient of sample series $X=[x_0, x_1, \ldots, x_{n-1}]$ is $$r(l) = \frac{\sum_{i=0}^{n-1} x_i x_{i+l \bmod n}}{\sum_{i=0}^{n-1} x_i^2},$$

where l is the lag. The lag is the number of sample points by which the sample series X is cyclically shifted to the left. The autocorrelation coefficient quantifies by how much the products of pairs of sample points cancel each other. In the present analysis, X is a power-up bit-string. Thus, the $x_i$ are power-up values having values $\{0,1\}$, and the autocorrelation coefficient r(l) lies in range [0,1]. Value r=1 indicates 100% autocorrelation in the same sense, and r=0 indicates 100% autocorrelation in the opposing sense, that is $x_i \neq x_{i+l \bmod n}$ for all i. Lag l plays the critical role in the computation of autocorrelations. In particular, we can use lag l to determine whether a series of sample points is independent by performing an autocorrelation for different lags. Only for lag l=0 should autocorrelation coefficient r(l) assume value 1. For all other lags 0<l<n, the autocorrelation coefficient should be near 0.5, if the 0's and 1's are uniformly distributed.

Figure 4A:
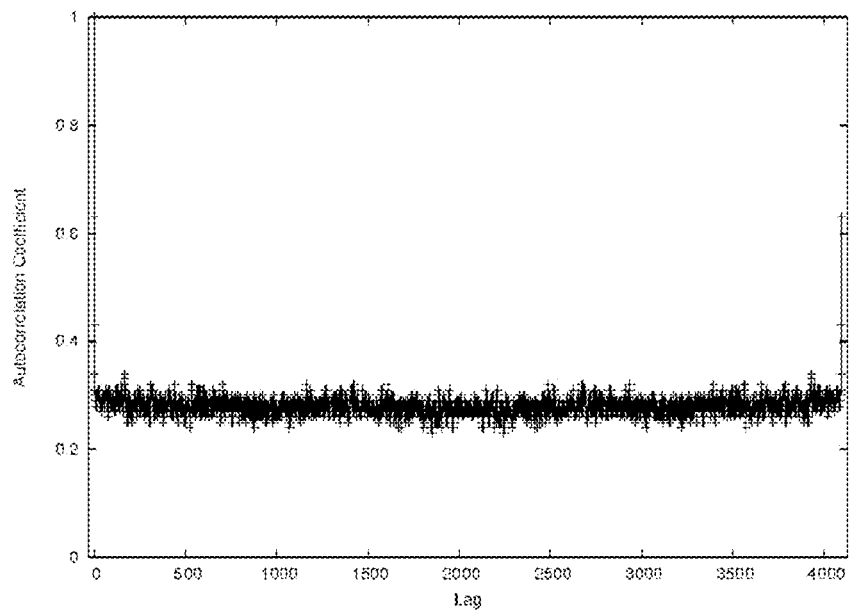
FIGS. 4A-4C are graphs depicting autocorrelation of bit-strings generated from representative samples of power-up state data.
Figure 4B:
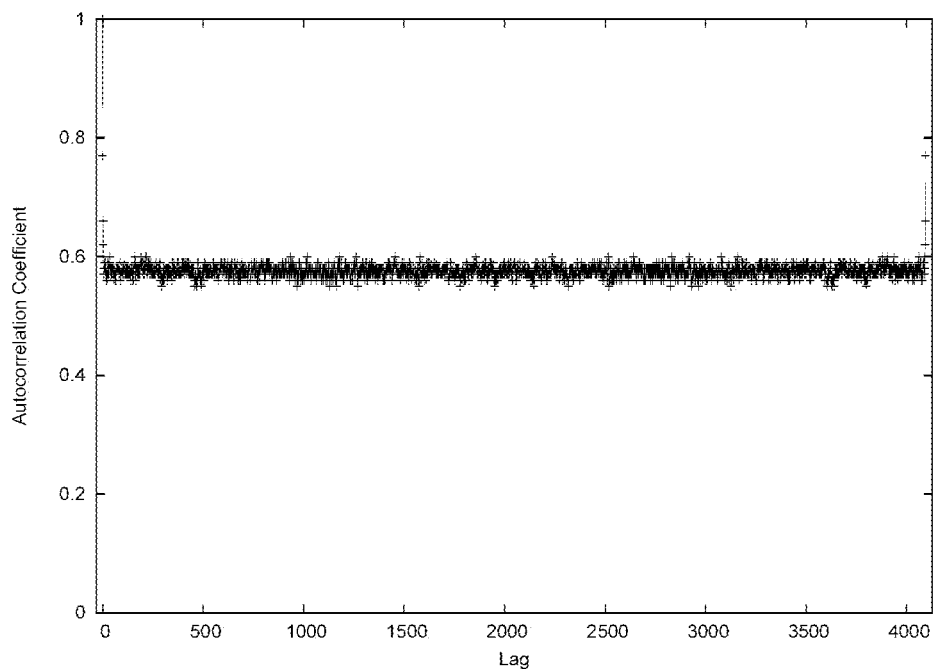
Figure 4C:
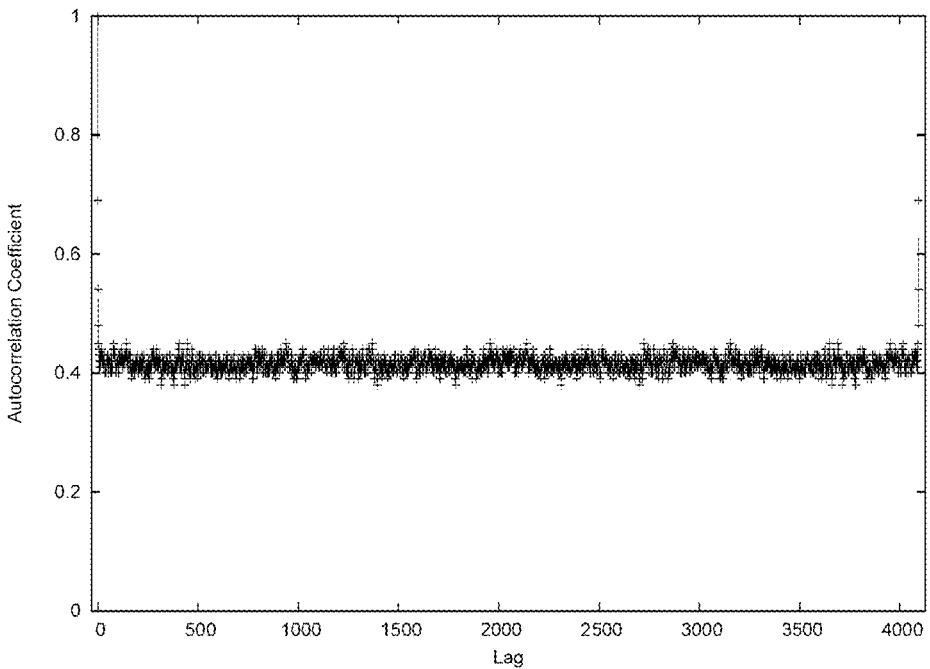

Referring now to FIGS. 4A-4C, autocorrelation coefficients for three representative sample bit-strings, chosen from the left and right boundaries of the data displayed in FIG. 2, are shown. FIG. 4A shows the autocorrelation coefficient versus lag for a sample containing with 28% of the power-up bit states having a value of "1", and FIG. 4B and FIG. 4C show the same for samples having 42% "1" bits and 58% "1" bits, respectively. FIG. 4B shows autocorrelation behavior for data having a number of "1" bits that is close to the overall mean number of "1" bits in the analysis. For all samples, autocorrelation coefficient r(l) is equal to the ratio of the number of "1" bits in the bit-string for most lags. However, for lag values l=1, 2 4094 and 4095, autocorrelation coefficient r(l) is slightly greater, indicating that the power-up values of individual bits are not entirely independent. Instead, pairs of neighboring bits appear to affect each other's power-up values. Nevertheless, the neighboring cell dependence is relatively small, and the power-up values can generally be viewed as independent.

Hamming Distance

Another indicator of the distribution of 0's and 1's in the power-up bit-strings is the Hamming distance between two bit-strings. The Hamming distance of two bit-strings $X=[x_0, x_1, \ldots, x_{n-1}]$ and $Y=[y_0, y_1, \ldots, y_{n-1}]$ of equal length n is the number of differing bits, formally defined as:

$$HD(X, Y) = \sum_{i=0}^{n-1} [x_i \neq y_i]. \quad (1)$$

using Iverson's APL notation for predicate A:

$$[A] = \begin{cases} 1 & \text{if } A \text{ is true,} \\ 0 & \text{otherwise.} \end{cases}$$

FIGS. 5A and 5B present a table that lists the Hamming distances between the SRAM fingerprints for all pairs of die. For each die, an SRAM fingerprint was computed as described above by including the bit-strings of all power-cycle tests for all ($V_{dd}$,T)-conditions. If the power-up state values of the static storage cells were uniformly distributed, a Hamming distance of HD(X,Y)=n/2, would be expected, because half of the possible events $(x_1,y_1) \in \{(0,0), (0,1), (1,0), (1,1)\}$ have differing bits. The results shown in the table of FIGS. 5A and 5B for n=4,096 indicate that the actual Hamming distances are relatively close to the ideal value of 2,048, with an overall mean of mean (HD)=1979.4. More importantly, the tables show that SRAM fingerprints of length n=4,096 do clearly identify each of the 32 die included in the tests by means of Hamming distances.

Voltage and Temperature

Figure 6:
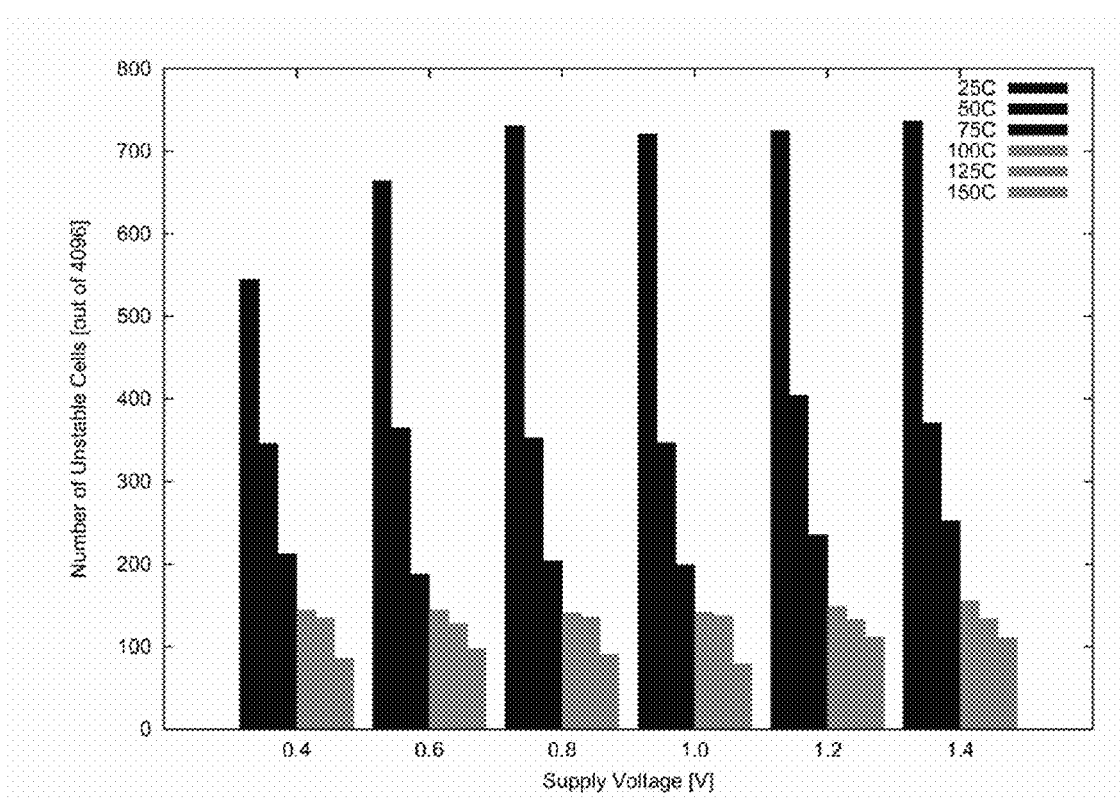
FIG. 6 is a graph depicting unstable bit counts versus supply voltage and temperature.

Referring now to FIG. 6, results from power-cycle experiments for one die based on a total of 2,097 bit-strings, or about 58 power-up bit-strings (at least 49) per ($V_{dd}$,T)-condition. Each bit-string contains 4,096 bits. FIG. 6 shows the number of unstable cells for each set of power-up measurements per ($V_{dd}$,T)-condition. (For each supply voltage condition, the bars are ordered from the lowest temperature condition to the highest from left to right.) Note that cells may be stable within multiple ($V_{dd}$,T)-conditions, but have different power-up values across ($V_{dd}$,T)-conditions. FIG. 6 does not show this phenomenon, which is discussed in further detail below. From FIG. 6, two observations are made:
1. The power-up state values depend on temperature, where an exponential decrease in the number of unstable cells is observed with increasing temperature.
2. The power-up state values are substantially independent of applied supply voltage. (As a second order effect, a slight increase in the number of unstable cells is seen with increasing voltage at a given temperature.)

Figure 7:
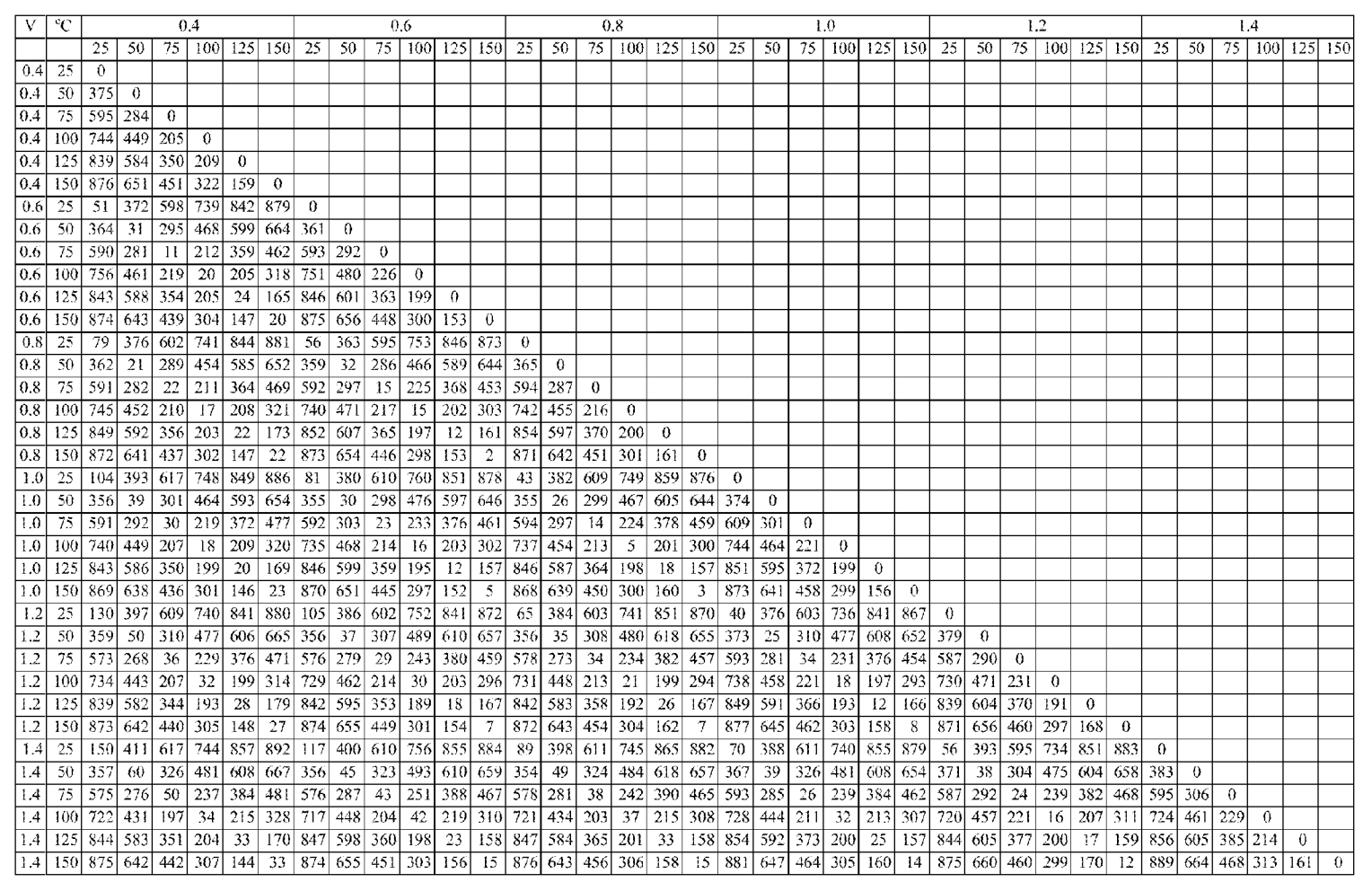
Figure 8A:
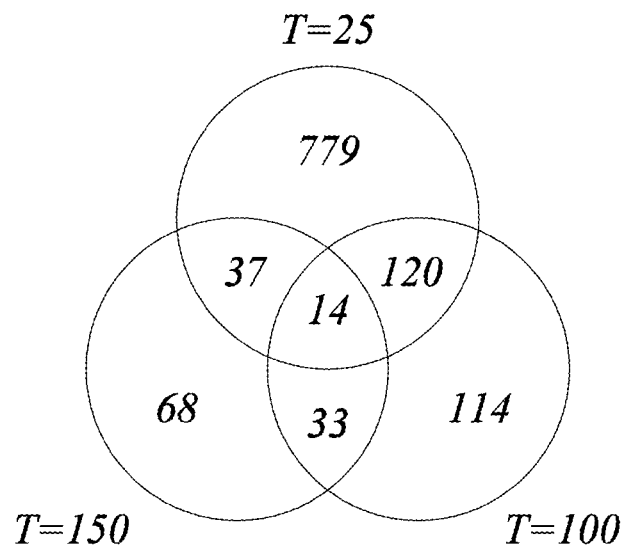
FIGS. 8A and 8B are Venn diagrams showing a relationship of voltage and temperature and cell stability.
Figure 8B:
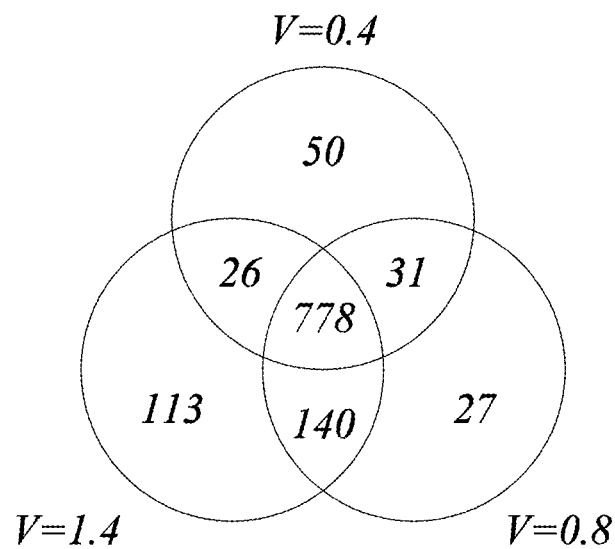

Referring now to FIG. 7, a different perspective on the data shown in FIG. 6 is presented in a table. The table of FIG. 7 shows Hamming distances of SRAM fingerprints that have been derived for each ($V_{dd}$,T)-condition. The dominance of the temperature dependence is also visible in the table. For each voltage, the Hamming distance increases with increasing temperature. Comparatively, the Hamming distance increases only modestly for increasing voltage at the same temperature. Additional information about the voltage and temperature dependence of the power-up values can be gained from plotting a Venn diagram of the unstable cells. FIGS. 8A and 8B show the cardinalities of subsets of cells that are unstable under certain voltage and temperature conditions. For the benefit of clarity, in each Figure, only a subset of three different voltages or temperatures are shown. FIG. 7A shows that 779 cells are unstable at T=25, another 120 cells are unstable at both temperatures T=25 and T=100, and other counts as shown in the remainder of FIG. 7A. It is observed that only 14 cells are unstable at all three temperatures, indicating that different temperatures effect the stability of different sets of cells. In contrast, for the voltage dependence Venn diagram shown in FIG. 7B, most of the unstable cells (778) are unstable at all voltages. Only a small fraction is unstable for any one particular voltage, such as the count of 50 cells shown for V=0.4V. Therefore, to the first order, power-up values depend on the temperature, but not on supply voltage, and a substantial portion of the memory cells, up to about 20%, become unstable at lower temperatures. Furthermore, different cells become unstable at different temperatures.

Temperature Dependence of Fingerprints

Figure 9:
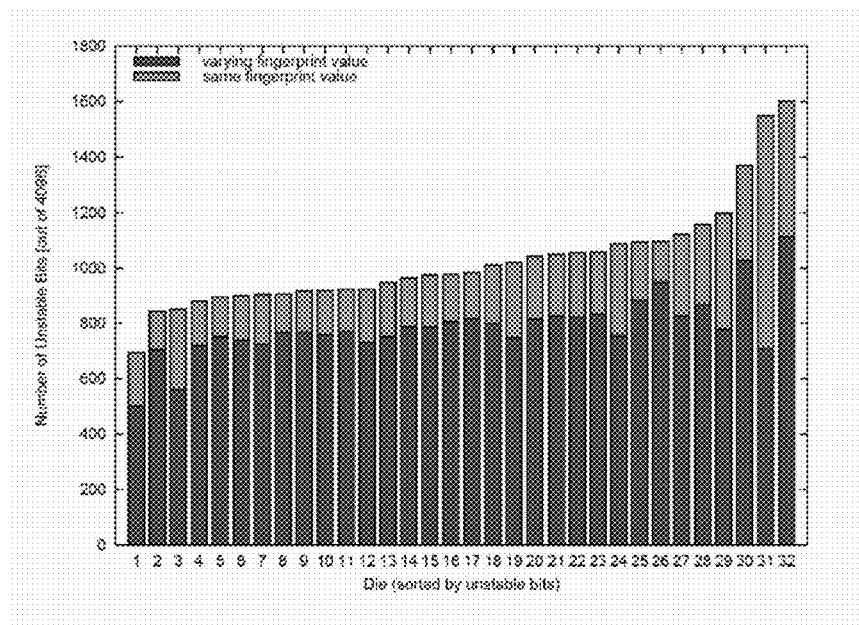
FIG. 9 is a graph depicting a number of unstable bits for each of 32 die showing a number of bits having varying fingerprint values and unvarying fingerprint values over temperature and voltage variation.

The temperature dependence of SRAM fingerprints, in particular the exponential behavior exhibited in FIG. 6 is likely due to a fundamental property of the SRAM circuit of a memory cell. Therefore it is desirable to determine how much of the instability of power-up values observed in the above-described tests is due to noise, meta-stability, or statistical effects due to process variation, as opposed to deterministic effects caused by operating temperature. On an empirical basis, if the fingerprints for each ($V_{dd}$,T)-condition of a die are considered, as shown in the table of FIGS. 7A-7B, the contribution of environmental noise can be evaluated. A fingerprint is computed from the set of bit-strings measured at a particular ($V_{dd}$,T)-condition. At one ($V_{dd}$,T)-condition, some of the cells are unstable, which may be attributed to non-deterministic effects. All stable cells assume a unique power-up value, which cannot be attributed to non-deterministic effects. For a different ($V_{dd}$,T)-condition, the same cells may be stable as well, but can assume a different power-up value. Without distinguishing the ($V_{dd}$,T)-conditions, the cells assuming a difference power-up value would be considered unstable. Referring now to FIG. 9, the number of unstable cells is shown for each of the 32 die, and are separated into those with different fingerprint values under different ($V_{dd}$, T)-conditions (upper portion of bars) and those where the fingerprint value is the same for all ($V_{dd}$,T)-conditions (lower portion of bars). It is observed from FIG. 9, that, on average, only about 23% of all unstable cells yield the same fingerprint value for each ($V_{dd}$,T)-condition. Most of the cells yield different fingerprint values for different ($V_{dd}$,T)-conditions, and, it appears that those cells are stable for individual ($V_{dd}$, T)-conditions. The above results indicate that environmental noise is a minor contributor to the instability of power-up values.

Figure 10A:
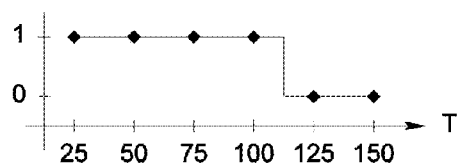
FIGS. 10A and 10B are graphs depicting unstable bit behavior vs. temperature.
Figure 10B:
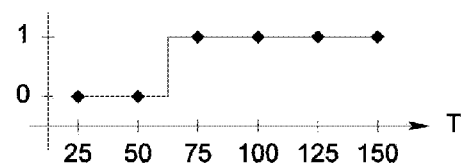

Closer examination of the fingerprint bit values of individual cells shows that unstable cells exhibit a distinguished temperature dependence. Either, the fingerprint bit value is "0" for low temperatures and "1" for high temperatures, or vice versa. Referring to FIGS. 10A and 10B, the behavior of individual cells is shown, indicating a crossover temperature, below and above of which the cell assumes a different power-up value. FIG. 10A illustrates the behavior of a cell having a nominal (expected) power-up value of "1" for temperature conditions below 112° C. and a nominal power-up value of "0" above 112° C. Similarly, FIG. 10B illustrates the behavior of a cell having a nominal power-up value of "0" for temperature conditions below 62° C. and a nominal power-up value of "0" above 62° C. Since the power-up behavior of the unstable cells is not deterministic, FIGS. 10A and 10B are intended to illustrate a probabilistic (expected value) behavior and not a consistent behavior of the exemplary cells. Analysis of power-up data reveals that 90% of all unstable cells with varying fingerprint value exhibit the temperature dependence illustrated in FIGS. 10A and 10B. The remaining 10% toggle their fingerprint value more than once within the temperature range. A SRAM cell is generally a cross-coupled amplifier as illustrated in FIG. 1A, which exhibits positive feedback and regenerates the smallest of differential voltages. At the initial application of power supply voltage, the complementary outputs of an ideally symmetric cell will both rise to $V_{dd}/2$, which is the high-gain region, and the regeneration process will begin. An ideally symmetric SRAM cell maintains the meta-stable state where the voltages remain at $V_{dd}/2$. Otherwise, the slightest voltage difference will be amplified and the cell latches one of the two possible power-up values. A voltage difference can arise from a number of factors which can be classified into four categories:

(1) Environmental effects including supply voltage and temperature. Because the cell is differential the effects for this category are generally negligible in the fingerprinting result.

(2) Process variation, which affects threshold voltage, mobility, contact resistance, etc. The effects of process variation will bias the cell in one direction indefinitely. Strong shifts in process variation are responsible for stable bits.

(3) Random noise. Random events such as thermal noise, flicker noise, etc. can appear in the high gain region and trigger the cell to regenerate. Noise events are responsible for highly unstable bits.

(4) Environmental effects on process variation. The effects of process variation are highly dependent on temperature and voltage. Hence, the bias due to process variation can be weaker or stronger depending on the environmental conditions. For example, the gain of a transistor depends on the threshold voltage and the mobility. The threshold voltage depends nonlinearly on temperature and linearly on mobility. Consequently, a cell's regeneration polarity can change as a function of temperature, causing the cell to be unstable. Furthermore, a cell can be stable for two different temperatures but assume complementary power-up values.

Temperature dependency of the effects of process variation on the electrical power-up behavior of a SRAM cell can be analyzed in detail as follows. Assuming a perfectly symmetric SRAM cell except for asymmetries in the two pull-down n-FETs (e.g., transistors N1 and N2 in FIG. 1A) due to process variation, the effect of temperature on process variation can be analyzed. A further assumption is that there exists a voltage and temperature where both n-FETs drive equal currents, causing the cell to become meta-stable when powering up. Below are the equations for the three relevant quantities for long-channel devices. (Short-channel devices can be treated by an analogous analysis). The drain current is:

$$I_{DS} \propto \mu (V_{GS}-V_{th})^2,$$

where $V_{GS}$ is the voltage from gate to source, which is assumed to be temperature independent. The threshold voltage is $$V_{th}(T)=V_{th}(T_0)-\kappa(T-T_0),$$

where $T_0$ is 300K, $\kappa$ is the temperature coefficient of the threshold voltage (typical $\kappa=2.4$mV/K), and T is temperature. The mobility is $$\mu(T) \propto \mu(T_0)\frac{T}{T_0}.$$

Substituting the expressions for $V_{th}(T)$ and $\mu(T)$ gives us an expression for the drain current $$I_{DS} \propto \frac{\mu}{T}(\nu + \kappa T)^2, \text{ where } \mu, \nu, \kappa \text{ are constant.} \quad (2)$$

Assuming that constant $\kappa$ is not affected by process variation but that constants $\kappa$ and $\nu$ are, for each of the two n-FETs, we have constants $\mu_1$, $\nu_1$ and $\mu_2$, $\nu_2$, and $\mu_1 \neq \mu_2$ and $\nu_1 \neq \nu_2$ in general. By definition, the drain currents through the n-FETs of a SRAM cell are the same in the meta-stable state. Hence, the following condition holds:

$$\frac{\mu_1}{T}(\nu_1 + \kappa T)^2 = \frac{\mu_2}{T}(\nu_2 + \kappa T)^2 \Leftrightarrow \frac{\mu_1}{\mu_2} = \left(\frac{\nu_2 + \kappa T}{\nu_1 + \kappa T}\right)^2. \quad (3)$$

Therefore, it can concluded that in the meta-stable state at temperature T due to process variation, if $\mu_1 < \mu_2$ then $\nu_1 > \nu_2$, and if $\mu_1 > \mu_2$ then $\nu_1 < \nu_2$.

Assuming the same SRAM cell is operated at temperature $T' \neq T$, according to Equation 2 above, the currents through n-FET 1 and n-FET 2 are $I'_{DS,1} \propto \mu_1/T'(\nu_1 + \kappa T')^2$ and $I'_{DS,2} \propto \mu_2/T'(\nu_2 + \kappa T')^2$. Substituting $\mu_1$ according to Equation 3 above, the following relation results:

$$I'_{DS,1} \propto \frac{\mu_2}{T'}\left(\frac{\nu_2 + \kappa T}{\nu_1 + \kappa T}\right)^2 (\nu_1 + \kappa T')^2 = I'_{DS,2}\left(\frac{\nu_2 + \kappa T}{\nu_1 + \kappa T} \cdot \frac{\nu_1 + \kappa T'}{\nu_2 + \kappa T'}\right)^2. \quad (4)$$

Introducing name $\alpha$ in the ratio $I'_{DS,1}/I'_{DS,2} = \alpha^2$, the circuit structure imposes $\alpha > 0$. In addition, introducing voltage shift $\nu_s$ such that $\nu_2 = \nu_1 + \nu_s$, the following relations result:

$$\alpha > 1 \Leftrightarrow \frac{\nu_2 + \kappa T}{\nu_2 + \kappa T'} > \frac{\nu_1 + \kappa T}{\nu_1 + \kappa T'} \Leftrightarrow \quad (5)$$

$$\frac{\nu_1 + \kappa T + \nu_s}{\nu_1 + \kappa T' + \nu_s} > \frac{\nu_1 + \kappa T}{\nu_1 + \kappa T'} \Leftrightarrow \nu_s(\nu_1 + \kappa T') > \nu_s(\nu_1 + \kappa T).$$

Since $\nu_s > 0$ implies $\nu_2 > \nu_1$, it can be concluded from Equation 5 that $\nu_2 > \nu_1 \Rightarrow T' > T$ and $\nu_2 < \nu_1 \Rightarrow T' < T$. The converse results are obtained for $\alpha < 1$. Furthermore, $\alpha > 1$ implies $I'_{DS,1} > I'_{DS,2}$, and the following relations are obtained:

$$I'_{DS,1} > I'_{DS,2} \text{ if } T' > T, \quad (6)$$

$$I'_{DS,1} > I'_{DS,2} \text{ if } T' < T. \quad (7)$$

For $\nu_2 < \nu_1$ the converse relations of those for $\nu_2 > \nu_1$ above hold. Relations (6) and (7), above, can be interpreted such that for temperature T', one of the n-FETs drives a stronger current than the other. The imbalance in current causes the feedback loop to latch a stable state. Therefore, there exists just one inflection point at meta-stability temperature T. If the temperature is T'<T the cell will latch one state, and for T'>T the cell latches the complementary state. The above analysis explains the behavior illustrated in FIGS. 10A and 10B. Since the amplification of a SRAM cell is significant, the sensitivity of the crossover temperature is very high, and can be approximated by a step function. Thus, the observed random behavior of power-up values can be reduced primarily to process variation. A SRAM cell is either stable if process variation introduces a strong bias in the drive strengths, or it causes the step-function behavior illustrated in FIGS. 10A and 10B, in which the crossover temperature depends on the process variation.

Probabilistic Fingerprint Model

Elementary probability theory can be used to model the fingerprints of a SRAM. In particular, a probabilistic similarity measure can be introduced and a lower bound on the length of fingerprints can be determined therefrom.

Graph-Theoretical Problem Description

Figure 11:
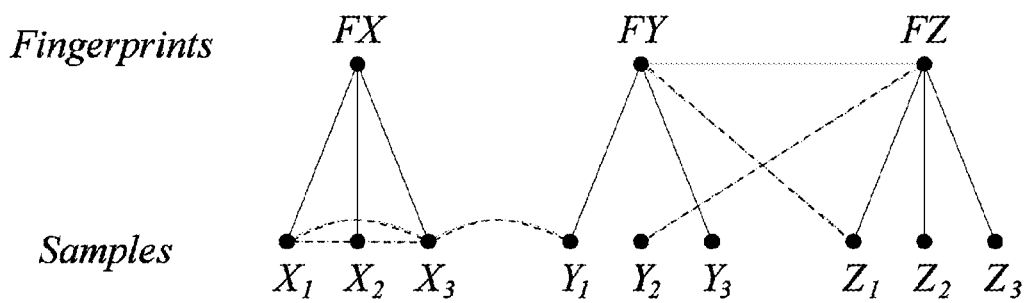
FIG. 11 is a diagram depicting a graph-theoretical model of device identification via fingerprint matching.

The problem of identifying a chip by means of a SRAM fingerprint can be represented abstractly using a graph, as shown in FIG. 11. Assume we have three entities (particular die in the example) X, Y, and Z with fingerprint samples $X_1$, $X_2$, $X_3$, $Y_1$, $Y_2$, etc. It is desirable to generate a representative fingerprint for each entity, such as FX=fingerprint(X) for entity X, that can identify the die. Fingerprints generated according to existing techniques that do not consider temperature dependence provide such a representative fingerprint, but more apt choices are possible, an example of which is described below. To identify entity X using its corresponding fingerprint $X_2$ fingerprint $X_2$ is compared with representative fingerprints FX FY, and FZ, to obtain a positive identification for entity X and negative identifications for entities Y and Z. A graph G=(V,E), illustrated by FIG. 11, consists of the set of vertices V comprising the sample and representative fingerprints. Restricting the analysis to fingerprints in form of bit-strings and finite numbers of entities and samples, the set of edges E represents the fingerprint matching function M such that edge (u,v) between vertices u and v exists if M(u,v) detects a match between the associated fingerprints. Matching function M(u,v) shall detect matches and mismatches such that the following edges exist or do not exist, respectively:

($X_i$,FX) exists: sample $X_i$ matches fingerprint FX
($X_i$,FY) does not exist: sample $X_i$ mismatches fingerprint FY If these two types of matches and mismatches were the only relations between fingerprints and samples, the graph would be a "forest" of star-subgraphs with a representative fingerprint in the center of each star. Each sample fingerprint would be associated uniquely with its representative fingerprint by the solid lines in FIG. 11. If edge ($X_i$,FX) does not exist, such as ($Y_2$,FY) in FIG. 11, a false negative is present that does not identify a legitimate sample $X_i$ with its representative fingerprint FX. To the contrary, a false positive identifies a sample with the wrong representative fingerprint, e.g., edges ($Y_2$, FZ) and ($Z_1$, FY). Note that false positives of different types occur in FIG. 11. Sample $Z_1$ matches both representative fingerprints FZ and FY. In contrast, sample $Y_2$ matches FZ only. In the former case, the false positive can be detected, in the latter case it cannot. The following list summarizes the different types of edges beyond matches and mismatches:

($X_i$,FX)does not exist: false negative.
($X_i$,FY) exists: false positive.
($X_i$,$X_j$) exists: sample $X_i$ matches sample $X_j$, e.g. edges ($X_1$, $X_2$), ($X_2 \leq X_3$),
($X_3$,$X_1$) in FIG. 11; match considered normal.
($X_i$,$Y_j$) exists: sample $X_i$ matches sample $Y_j$, cf. edge ($X_3$, $Y_1$) in FIG. 11; match indicates that fingerprinting method may be incapable of identification.
(FX,FY) exists: representative fingerprint FX matches representative fingerprint FY, cf. edge (FY,FZ) in FIG. 11; representative fingerprints do not identify associated entities uniquely.

The goal of the design of an identification scheme based on fingerprints is to generate representative fingerprints together with a matching function such that none of the cases above except edges $(X_i, X_j)$ will occur. In a probabilistic version of the identification scheme, it is desirable to maximize the probability of matching and mismatching samples with representative fingerprints and minimize the probability of the occurrence of the undesirable cases above.

Power-Up Values of an SRAM Cell

Figure 12:
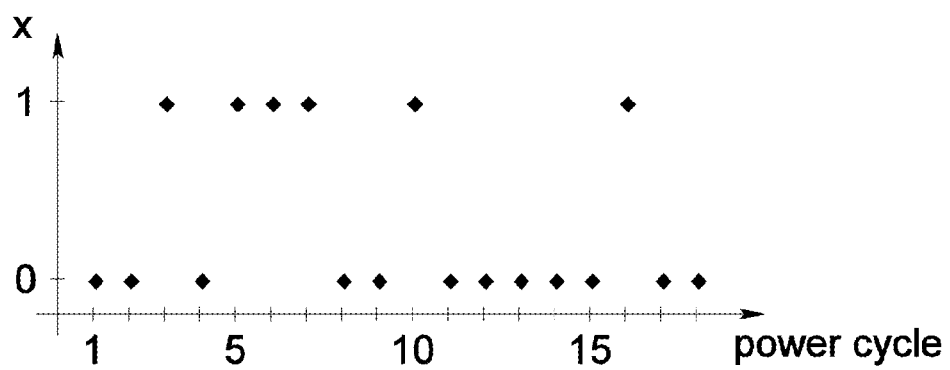
FIG. 12 is a graph depicting the behavior of an unstable bit for a sequence of power cycles.

When power is initially applied to an SRAM (or other device containing static storage cells), each 1-bit cell assumes a binary value, the power-up value $x \in \{0,1\}$. Subscript i is used in the following to refer to the value of a cell of index i as $x_i$. A cell is considered stable if it assumes the same value after each power cycle, and unstable if its value changes. It can be assumed that every memory cell is eventually unstable, that is over a large number of power cycles different power-up values will be obtained. However, for practical purposes, the observation period is limited, and therefore some cells will appear to be stable. FIG. 12 illustrates the power-up value of an unstable cell during a series of power cycles. The mean $\bar{x}_i$ of power-up values $x_i(k)$ of unstable cell i over m power cycles is:

$$\bar{x}_i = \frac{1}{m}\sum_{k=1}^{m} x_i(k), \quad (8)$$

in which k denotes the power cycle. For example, the mean of the power-up values x(k) in FIG. 12 over m=18 power cycles is $\bar{x}=6/18$. The expected power-up value $E(x_i)$ of unstable cell i by thresholding can be defined as:

$$E(x_i) = \begin{cases} 0, & \text{if } \bar{x}_i < 0.5 \\ 1, & \text{if } \bar{x}_i \geq 0.5. \end{cases} \quad (9)$$

Based on 18 power cycles, the expected power-up value of the cell exemplified by FIG. 12 is $E(x)=0$. Next, the outcome of a power-cycle test, the power-up event $Q(x_i)$ of cell i, can be defined as a random variable:

$$Q(x_i) = \begin{cases} 1, & \text{if } x_i = E(x_i) \\ 0, & \text{if } x_i \neq E(x_i). \end{cases} \quad (10)$$

Cell i assumes the expected power-up value if the outcome of a power-up experiment results in $Q(x_i)=1$, and cell i assumes the unexpected power-up value if $Q(x_i)=0$. For the graph depicted in FIG. 12, the unexpected power-up value is given by $Q(x(k))=0$ during power cycles $k \in \{3, 5, 6, 7, 10, 16\}$, and the expected power-up value is given by $Q(x(k))=1$, for the remaining power cycles. The sample mean of m power-up events $$\overline{Q}(x_i) = \frac{1}{m}\sum_{k=1}^{m} Q(x_i(k)) \quad (11)$$

characterizes the stability of the power-up values of a memory cell. If $\overline{Q}(x_i)=1$, then memory cell i is stable. On the other hand, if $\overline{Q}(x_i)=\frac{1}{2}$ (for even m), then the cell at position i is "maximally" unstable, in other words, the power-up value of the cell toggles either from 0 to 1 or vice versa during each power cycle. For half of the power cycles (every other cycle) the power-up value equals the expected power-up value, and during the other half they differ. In fact, $\overline{Q}(x_i)$ lies in range [½, 1]. In order to denote the probability that cell i assumes its expected power-up value, the sample mean is scaled to cover range [0,1] according to:

$$q(x_i) = 2\overline{Q}(x_i) - 1. \quad (12)$$

Thus, if cell i is stable $q(x_i)=1$, and if cell i is "maximally" unstable $q(x_i)=0$. The probability that cell i assumes its expected power-up value is therefore 0. In other words, $q(x_i)=0$ indicates that cell i has an indeterminate expected power-up value.

According to the law of large numbers, a sample mean approaches the true mean for large numbers of power cycles. Thus, by gathering power-up values over a sufficiently large number of power cycles, the probability of the expected power-up event can be determined empirically. In practice, 20 samples are often considered sufficient. For example, for the fingerprint in Table I in the Background, there are m=8 samples from which the expected power-up values are computed, and the probabilities that each bit will assume its expected power-up value are given as follows:

TABLE II

| i | 0 | 1 | 2 | 3 | 4 | 5 |
|---|---|---|---|---|---|---|
| $E(x_i)$ | 0 | 1 | 1 | 0 | 1 | 1 |
| $q(x_i)$ | ¾ | 1 | ½ | 1 | 1 | 0 |

Similarity Measure

The present invention uses a new similarity measure for fingerprints having probabilistic bit-strings. One benefit of the similarity measure of the present invention is that it permits smaller fingerprint lengths for chip identification than when using the Hamming distance. The distance D(X,Y) between two fingerprints $X=[x_0, x_1, \ldots, x_{n-1}]$ and $Y=[y_0, y_1, \ldots, y_{n-1}]$, both of length n, and probabilities $q(x_i)$ and $q(y_i)$ for $0 < n$ given by Equation 12 above can be defined as:

$$D(X, Y) = \sum_{i=0}^{n-1} [x_i \neq y_i] q(x_i) q(y_i) - \sum_{i=0}^{n-1} [x_i = y_i] q(x_i) q(y_i) + n. \quad (13)$$

The distance accounts for both mismatches and matches, but with opposite signs. It is noted that $$D(X,Y) = 2HD(X,Y) \text{ iff } \forall i: q(x_i) = q(y_i) = 1.$$

Since the Hamming distance HD(X,Y), is a metric, distance measure D(X,Y) is a metric if the probabilities of all cells assuming their expected power-up values $q(x_i)$ and $q(y_i)$ are 1. Metric spaces are useful constructs, because they permit efficient searching, among other benefits. Defining the similarity S(X,Y) between fingerprints X and Y, both of length n, as $$S(X, Y) = 1 - \frac{D(X, Y)}{n}, \quad (14)$$

the similarity is bounded by $-1 \leq S(X,Y) \leq 1$, because the distance is bounded by $0 \leq D(X,Y) \leq 2n$. Furthermore, $$S(X,Y) = \begin{cases} 1 & \text{if } X = Y \text{ and } q(x_i) = q(y_i) = 1 \text{ for all } i, \\ 0 & \text{if } HD(X,Y) = \frac{1}{2} \text{ and } q(x_i) = q(y_i) = 1 \text{ for all } i, \\ & \text{or if } \forall i: q(x_i) = 0 \vee q(y_i) = 0, \\ -1 & \text{if } X = \neg Y \text{ and } q(x_i) = q(y_i) = 1 \text{ for all } i. \end{cases}$$

Hence, $S(X,Y)$ can be interpreted under the assumption that $q(x_i)=q(y_i)=1$, such that equal fingerprints have similarity $S=1$, complementary strings with $x_i \neq y_i$ for all $i$ have similarity $S=-1$, and strings with Hamming distance $HD(X,Y)=\frac{1}{2}$ have similarity $S=0$. In addition, the similarity measure enables comparison of fingerprints when the probabilities are less than 1. In particular, if $q(x_i)=0$ or $q(y_i)=0$, that is at least one of $x_i$ or $y_i$ has an indeterminate expected power-up value, then the similarity is $S=0$. Thus, $S=0$ indicates that two strings have Hamming distance $HD(X,Y)=\frac{1}{2}$ with power-up probabilities 1 or the power-up probabilities are 0 for at least one of the bits, yielding no information about the associated power-up value. For the purposes of fingerprint identification, there is no requirement to distinguish these two cases when the goal is to identify matches and mismatches independent of whether the mismatch is due to mismatching fingerprints with high power-up probabilities or whether the power-up probabilities are too low to permit identification.

Device Identification

The identification of a particular electronic device having static storage cells can be carried out by the similarity measure defined in Equation 14 above. Assuming that the expected power-up bit-string $E(X)$ is used as the representative fingerprint $FX=E(X)$, to identify a sample bit-string $X$ with a chip with fingerprint $FX$, and to distinguish it from all other chips with distinct representative fingerprints, two conditions must be fulfilled for a sample bit-string $X$:

$$S(X, FX) \begin{cases} \approx 1, & \text{if } FX = \text{fingerprint}(X), \\ < 1, & \text{if } FX \neq \text{fingerprint}(X). \end{cases}$$

The matching condition given above demands that the similarity of sample $X$ compared to its representative fingerprint $FX$ is much closer to 1 than to 0, that is that the bit-strings are equal with a relatively small number of exceptions. Therefore, it is necessary to know the power-up values of a majority of cells with high confidence, that is $q(x_i) \approx 1$. In contrast, the mismatching condition demands that the similarity of sample $X$ compared to all other representative fingerprints $FY$ in the sample space is closer to 0 than to 1. This result should be a consequence of the fact that the Hamming distance between the sample and the representative fingerprints of all other chips $Y$ is $HD(X,FY) \approx n/2$ with reasonably high probability. In practice, a similarity threshold $T_S$ is chosen that determines the quality of the identification. For example, if threshold $T_S=\frac{1}{2}$ is chosen, then $S(X,FY) \geq \frac{1}{2}$ is interpreted as a positive identification, and therefore $X$ is a sample string from a device having representative fingerprint $FY=FX \cdot S(X,FY)<\frac{1}{2}$ is then interpreted as a negative identification. Besides these two distinct identification decisions, there are two possible erroneous identification outcomes. If $X$ is a sample string from a chip with representative fingerprint $FX$, and $FY$ is the representative fingerprint from a different chip, the following decisions can be made, according to Table III.

TABLE III

| MATCH | FALSE POSITIVE |
|---|---|
| $S(X, FX) \geq T_S$ | $S(X, FY) \geq T_S$ |
| FALSE NEGATIVE | MISMATCH |
| $S(X, FX) < T_S$ | $S(X, FY) < T_S$ |

In the table, a match indicates that sample $X$ correctly identifies the associated chip, and a mismatch indicates that the chip with fingerprint $FY$ is not associated with sample $X$. A false positive incorrectly associates sample $X$ with a chip with fingerprint $FY$, and a false negative incorrectly fails to associate sample $X$ with the chip with fingerprint $FX$. A similarity measure is a reasonable means for chip identification only if the number of false positives and negatives is negligible, and the matches and mismatches identify chips correctly.

Figure 13:
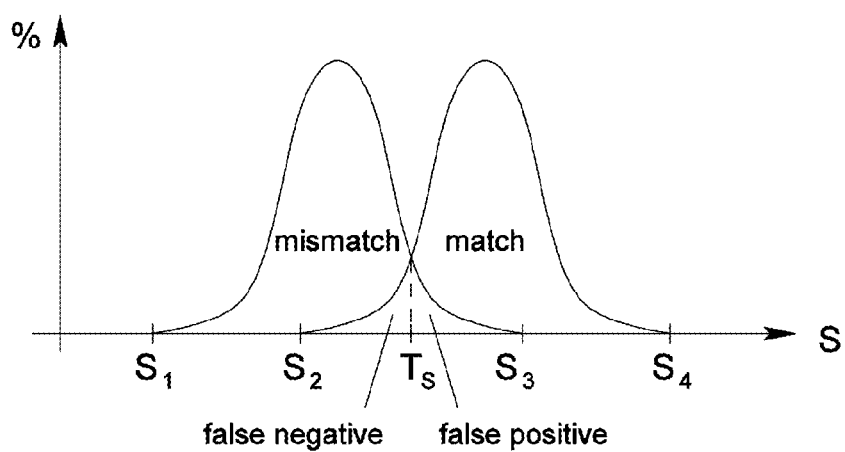
FIG. 13 is a graph depicting the distribution of similarity measure for matching and mis-matched fingerprints.

FIG. 13 illustrates the effectiveness of the above-described similarity measure according to a pair of distributions for match and mismatch conditions, in which:

$$S_1 = \min(S_{mismatch}) \leq S_{mismatch} \leq \max(S_{mismatch}) = S_3, \text{ and}$$

$$S_2 = \min(S_{match}) \leq S_{match} \leq \max(S_{match}) = S_4.$$

The similarity measure of sample fingerprints and representative fingerprints follows a distribution similar to the one illustrated in FIG. 13. Sample fingerprints $X$ from a chip associated with representative fingerprint $FX$ match this fingerprint, and exhibit a larger similarity value $S(X,FX)$ than those for other chips with representative fingerprint $FY$ and mismatching similarity $S(X,FY)$. Due to the probabilistic nature of the fingerprints, the similarity values can be characterized by distributions. In general, the similarity distributions of the matching and mismatching fingerprints overlap. For our similarity measure to always permit correct chip identification, we need to have $\max(S_{mismatch}) < \min(S_{match})$. Then, we can determine the threshold $T_S$, for example, to be the mean $T_S=(\max(S_{mismatch})+\min(S_{match}))/2$.

Birthday Paradox and Fingerprint Length

The quality of the chip identification scheme is directly related to the string length $n$ of the fingerprints. In fact, a lower bound for the number of bits $n$ can be derived from the well-known birthday paradox. The simple analysis of the birthday paradox introduces a random variable $X_{ij}$ which assumes value 1 if two people $i$ and $j$ have the same birthday in a year of $D$ days. Then the expectation of two people having the same birthday is $E(X_{ij})=1/D$, and the expectation that two out of $N$ people share one birthday is $N(N-1)/(2D)$. Consequently, if the number of people is approximately $N \geq \sqrt{2D}$, we expect two people to share the same birthday. From our perspective of chip identification we are interested in the converse case. Assuming we have $N$ chips with associated fingerprints, the size of the space of fingerprints such that no two fingerprints are the same can be determined. If a fingerprint is a bit-string of length $n$, there exist $2^n$ distinct fingerprints. Thus, according to the birthday paradox, no two fingerprints out of $N$ are expected to be the same if $N < \sqrt{2^{n+1}}$, or the number of bits in a fingerprint should be $n > 2 \ln N - 1$. The table below shows the (rounded) minimum expected string length $n$ of a fingerprint for various numbers of chips $N$.

| Chips N | $10^3$ | $10^6$ | $10^9$ | $10^{12}$ |
|---|---|---|---|---|
| Fingerprint length n (birthday paradox) | 20 | 40 | 60 | 80 |

-continued

| Chips N | $10^3$ | $10^6$ | $10^9$ | $10^{12}$ |
|---|---|---|---|---|
| Fingerprint length (recommended) | 200 | 400 | 600 | 800 |

While analysis of the birthday paradox is based on the expectation of one shared birthday, it is of interest to minimize the probability of sharing a fingerprint. Therefore, the number of bits in a fingerprint should be required to be n>>2 ln N−1 to increase the quality of our identification scheme. Our empirical results below suggest that about ten times as many bits, that is about 20 lg N bits, constitute a reasonable choice. Fingerprint lengths of hundreds of bits can be considered practical, given that typical numbers of SRAM cells on todays' chips exceed this count comfortably.

Practical Fingerprinting Method

A fingerprinting method in accordance with an embodiment of the present invention is described below, which is robust across a wide range of supply voltages and temperatures. Given the assumption that over a large number of power cycles every SRAM cell will be unstable and in particular, that under different supply voltages and temperatures, every cell can assume a power-up value different from its expected power-up value, the fingerprinting technique of the present invention can be made more reliable. Each static storage cell is associated with the pair of the expected power-up value and the probability of assuming this value (E,q) as defined in Equations 9 and 12 above. To account for the temperature dependence, the fingerprint generation technique in accordance with an embodiment of the present invention described below includes refinements as follows. A device identifier (CID) can be defined as follows:

For n SRAM cells and $m_0$ power-cycle experiments at environmental conditions $(V_{dd},T_0)$ and $m_1$ power-cycle tests at $(V_{dd},T_1)$, an identifier (CID) can be determined as the sequence of pairs CID=[$(E(x_0),q(x_0)),(E(x_1),q(x_1)), \ldots, (E(x_{n-1}),q(x_{n-1}))$], such that $$(E(x_i), q(x_i)) = \begin{cases} (0, 0) & \text{if } E(x_i, T_0) \neq E(x_i, T_1), \\ \left(E(x_i), \dfrac{m_0 q(x_i, T_0) + m_1 q(x_i, T_1)}{m_0 + m_1}\right) & \text{otherwise,} \end{cases}$$

where $T_0$ is a lower temperature, such as 25° C., $T_1$ is a higher temperature, such as $T_1 \approx 150°$ C. and $V_{dd}$ is the nominal supply voltage. The characterization identifier given above excludes those unstable cells having power-up values that exhibit the temperature dependence shown in FIGS. 10A and 10B by asserting probability $q(x_i)=0$ for those cells, thereby inserting a static value that excludes the cells from later considerations of device similarity. According to the power-cycle tests described above, the number of these cells is about 20% of the total number of cells. The exclusion of the temperature dependent cells is compensated-for by increasing the length n of the CID, as described in further detail below. The characterization identifier (CID) serves as the representative fingerprint of a device. To identify a device, a single sample fingerprint of a power-cycle test can be obtained, referred to as the field identifier (FID), and matched against a repository of CID's of all manufactured chips. Since the FID consists of a single sample, it is assumed that $q(x_i)=1$ for all i, such that FID=[$(x_0,1), (x_1,1), \ldots, (x_{n-1},1)$]. The matching operation consists of computing for each CID the similarity measure S(FID, CID) of Equation 14 above, and makes the decision whether the FID matches the CID by evaluating the predicate S(FID,CID)≥$T_S$ for a similarity threshold $T_S$. If the predicate is true, a match is found. The same procedure may be used to authenticate a device by comparing its FID against a single CID. For more sophisticated applications an encrypted exchange of the FID or multiple challenge-response pairs of randomly selected bits for the FID can be employed.

The threshold $T_S$ for the identification procedure depends on the length n of the fingerprints. Length n is chosen based on the number of chips N that are to be distinguished and the stability of the power-up values, which is determined by the variation in the fabrication process. In the present embodiment $T_S$ is selected by sub-sampling the results of the power-cycle experiments used to determine the CID's of a number of chips. Each sub-sample selects, at random, a number of n bits out of $n_{cells}$ memory cells, n≤$n_{cells}$. Then, the associated power-up values are used as an n-bit FID, and the similarity measure is computed against the corresponding sample subset of bits of all CID's. The fingerprint length n is large enough if for all samples max($S_{mismatch}$)<min($S_{match}$). $T_S$ can then be chosen as the mean $T_S$=(max($S_{mismatch}$)+min($S_{match}$))/2 as described above. The central limit theorem guarantees that with increasing fingerprint length n, the similarity distributions will be closer to their expected values. Therefore, max($S_{mismatch}$) will become smaller and min($S_{match}$) 1 will become larger with increasing n, and a gap for a valid $T_S$ should emerge.

Characterization

Figure 14:
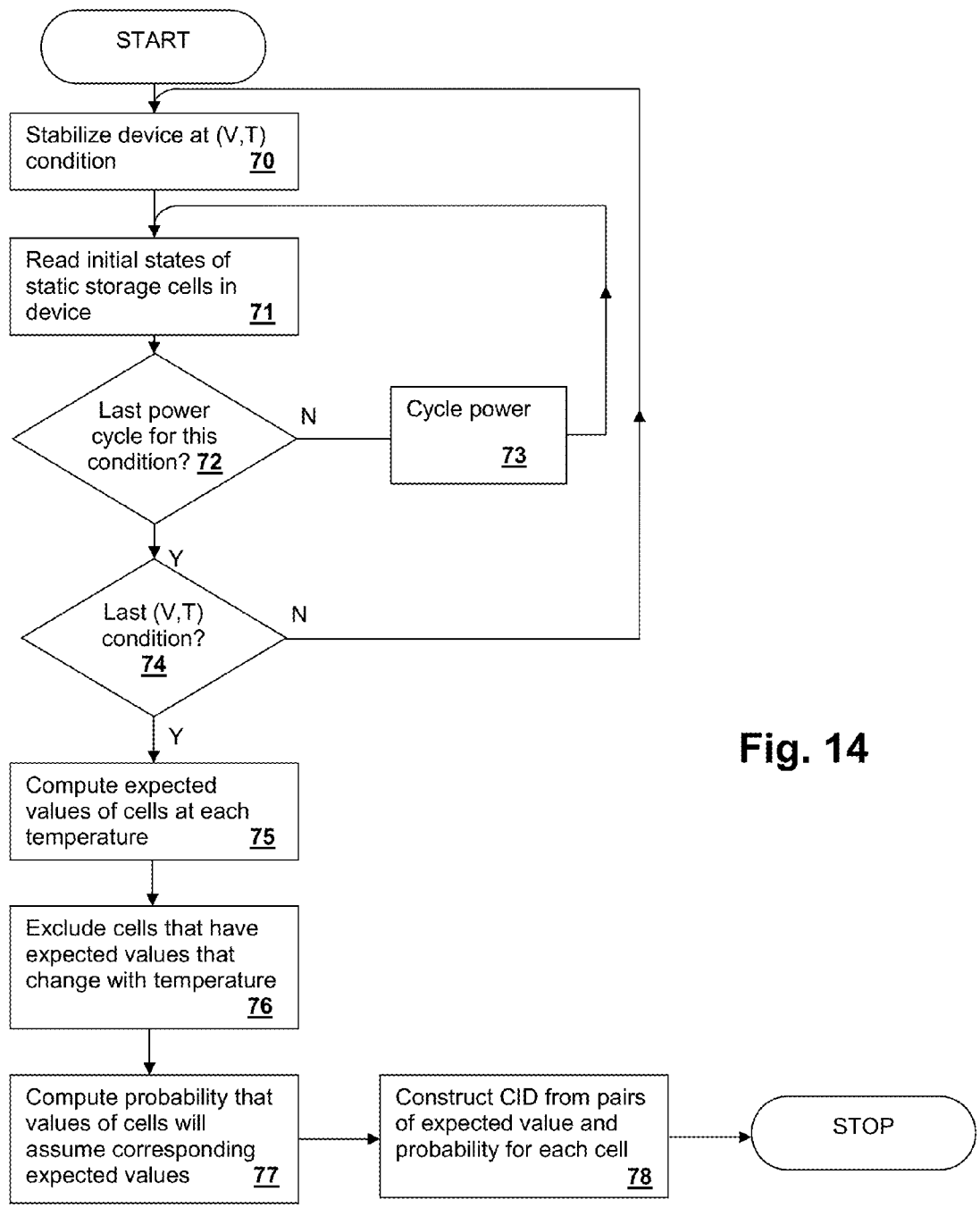
FIG. 14 is a flowchart depicting a fingerprint generating method in accordance with an embodiment of the present invention.

A method of device characterization in accordance with an embodiment of the present invention is depicted in FIG. 14. First, the device is stabilized at a particular ($V_{dd}$,T) condition (step 70) and the initial states of the static storage cells in the device are read (step 71). As noted above, and as justified by results of tests performed on 32 experimental die as will be described in further detail below, only two temperature conditions at a fixed (nominal) voltage condition are needed to provide a CID. However, the present invention contemplates CIDs computed from any number of ($V_{dd}$,T) conditions, and for some circuit designs and processes there may be an advantage to including additional ($V_{dd}$,T) above and beyond tests at nominal voltage and at the extremes of the operating temperature range for a device. Steps 70 and 71 are repeated for multiple power-cycles (e.g., m>20) at each ($V_{dd}$,T) condition to be tested by removing the applied power supply voltage and restoring it to cycle power (step 73) until the last power cycle for the current ($V_{dd}$,T) has been performed (decision 72). Until tests for the last ($V_{dd}$,T) condition have been completed (decision 74), steps 70-73 are repeated multiple times for each ($V_{dd}$,T) condition. Then, the expected values of the cells are computed at each temperature (step 75) and the cells that have expected values that change with temperature are excluded (step 76). The probabilities that the values of the cells will assume their corresponding expected values are computed (step 77) and the CID is constructed from pairs of the expected value and the probability for each cell (step 78). The tests should generally be performed at two temperatures using a nominal power supply voltage. The temperatures used should generally be the lower and upper bound of the recommended operating range of the device, e.g. at 25 C and 150 C, as noted in the section above entitled "Temperature Dependence of Fingerprints." Additional temperatures can be included to improve the quality of the CID, but the empirical results described above indicate that additional temperature tests are generally not needed and generally do not improve the similarity gap for the process and design that were tested, which are expected to be representative of SRAM devices. The method can therefore be performed as follows: for each device, perform m>20 power-cycle experiments to gather power-up values of all $n_{cells}$ memory cells for $(V_{dd},T_0)$ and $(V_{dd},T_1)$, where $V_{dd}$ is the nominal supply voltage, $T_0$ is a low temperature near the lower bound of the manufacturer's recommended operating range, and $T_1$ is a high temperature near the upper bound of the manufacturer's operating range. From the method depicted in FIG. 14, a repository of CID's can be compiled for subsequent similarity matching. The flowchart of FIG. 14 is only one example of an identifier generation technique in accordance with an embodiment of the present invention, and other potential algorithms are contemplated by the present invention.

Device Identification

Figure 15:
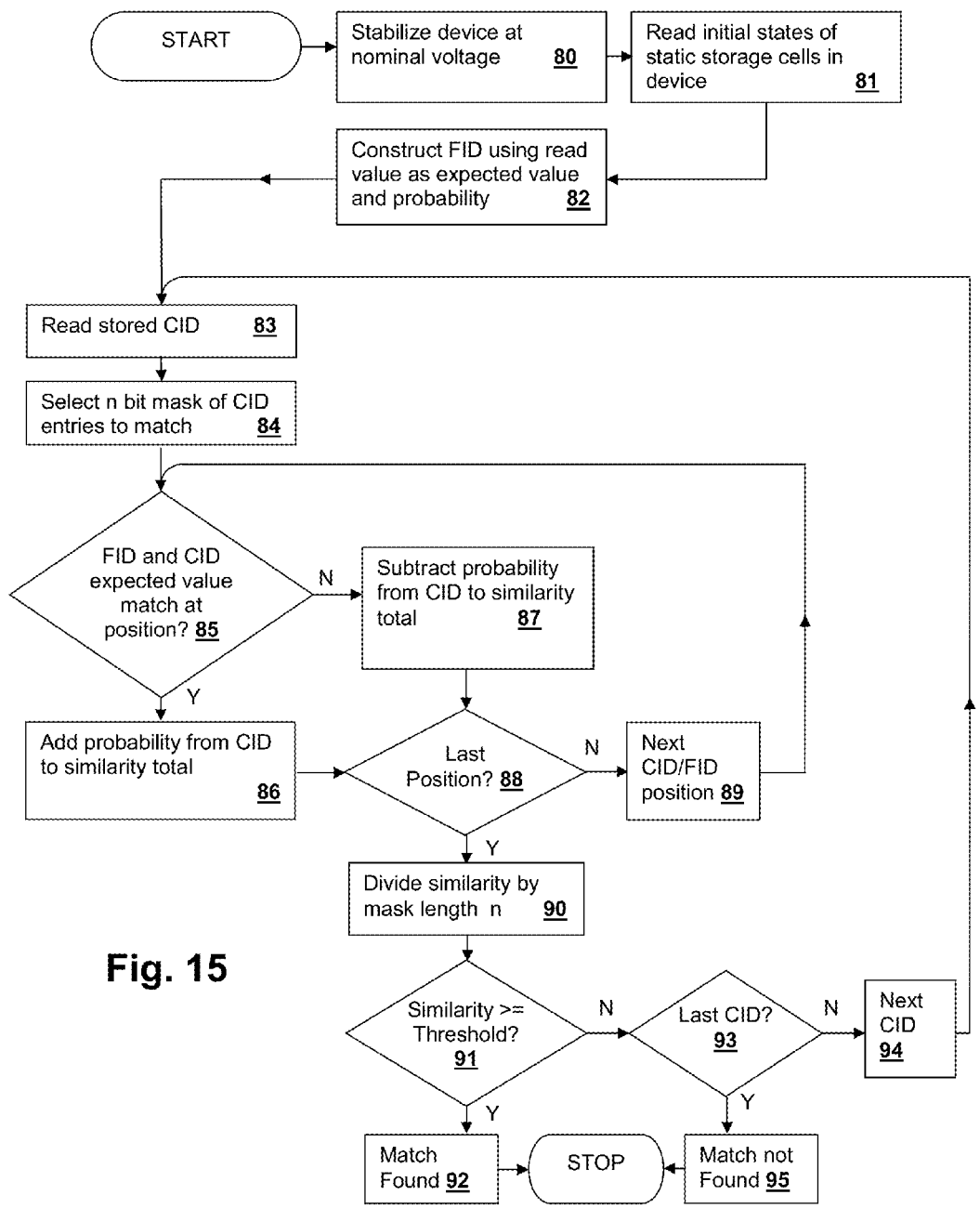
FIG. 15 is a flowchart depicting a fingerprint matching method in accordance with an embodiment of the present invention.

A method of device identification in accordance with an embodiment of the present invention is depicted in FIG. 15. First, the device is stabilized at a nominal power supply voltage (step 80), the initial states of the static storage cells in the device are read (step 81), an FID is generated from the values (step 82), and a stored CID is read from a repository (step 83). A mask of bits is selected (step 84), which may be a random selection or a selection of particular entries that will be matched between the CID and FID. However, the entire CID and FID may be matched, and the CID and FID may have any length sufficient to identify the device. (For any selection of a subset of values from the CID and FID, the entries corresponding to the same cells are selected for matching. Further, the FID entries may be extracted after the mask is selected, reducing the values that must be read from the device to extract the FID.) If the expected value entry in the FID matches the expected value entry in the corresponding position of the CID (decision 85), then the corresponding probability in the CID is added to the similarity total according to equation 14 above (step 86). If the value read from the device that forms an entry in the FID does not match the expected value for the corresponding entry in the CID (decision 85), then the corresponding probability is subtracted from the similarity total according to equation 14 above (step 87). Until the last entry position specified by the mask is compared (decision 88) steps 85-87 are repeated for the next position (step 89). After the last position is compared (decision 88), the similarity total is divided by the number of entries compared (step 90), e.g., the number of bits n in the mask selected in step 84, then the similarity total is compared to the similarity threshold (decision 91). If the similarity total meets or exceeds the threshold, a match is found (step 92) and the device is identified. If the similarity total does not meet the threshold (decision 91), then until the last CID in the repository has been compared (decision 93), the next CID is tested (step 94), repeating steps 83-91. If the similarity total does not meet the threshold (decision 91) after the last CID has been tested (step 93), then no match has been found (step 95) and the device is unidentified. The flowchart of FIG. 15 is only one example of an identification technique in accordance with an embodiment of the present invention, and other potential algorithms are contemplated by the present invention. For example, it can be advantageous to compare the FID against all CIDs in the repository, even if a match is found early on in the matching process. A stronger result is obtained when exactly one match is found across an entire set of potential identifiers, as multiple matches indicate the presence of a "false positive."

In order to determine the length of the CID constructed and matched by an FID according to the above method, i.e., the number of cells for which data is needed after the exclusion in step 74 in order to perform step 76 in FIG. 14, to construct a sufficiently long CID, the following procedure can be used. Sample FID experiments are performed with $n<n_{cells}$ randomly chosen memory cells. The desired fingerprint length n is then determined according to the planned number of manufactured chips as described in the section above labeled Birthday Paradox and Fingerprint Length, and the decision threshold $T_S$ is determined for n such that $$\max(S_{mismatch}) < \min(S_{match})$$

and $$T_S = (\max(S_{mismatch}) + \min(S_{match}))/2.$$

Empirical Verification

The above-described chip identification technique depends on the stability of static storage cells within a device. For a sample of devices tested, up to approximately 20% of all cells are unstable, and the vast majority (90%) of those cells exhibit the temperature dependence described above. To obtain a temperature independent identification method, the temperature-variant cells are ignored in the similarity measure by constructing the CID to assert a probability of 0 that the temperature-variant cells will assume their expected power-up value. Hence, the similarity total is neither incremented nor decremented for those cells according to the method depicted in FIG. 15. It remains to demonstrate the claim that there exists a fingerprint length n for which the similarity measure of matching and mismatching fingerprints exhibits a similarity gap of width $$S_{gap} = \min(S_{match}) - \max(S_{mismatch}) \qquad (15)$$

with $S_{gap} > 0$, such that a valid similarity threshold can be identified according to $$T_S = (\max(S_{mismatch}) \min(S_{match}))/2.$$

First, data are presented for a similarity gap over $n_{cells} = 4{,}096$, in which the CID is determined for each chip based on the entire data set of power-up strings, which are the most accurate CIDs that can be produced from the data set. Rather than using data sets at two temperatures and the nominal voltage, as prescribed above, the power-up strings are obtained for all available $(V_{dd},T)$-conditions, and $q(x_i)$ is computed as the mean value over all $(V_{dd},T)$-conditions. Furthermore, $q(x_i)=0$ is asserted for all cells i with differing expected bits for any pair of $(V_{dd},T)$-conditions.

Figure 16A:
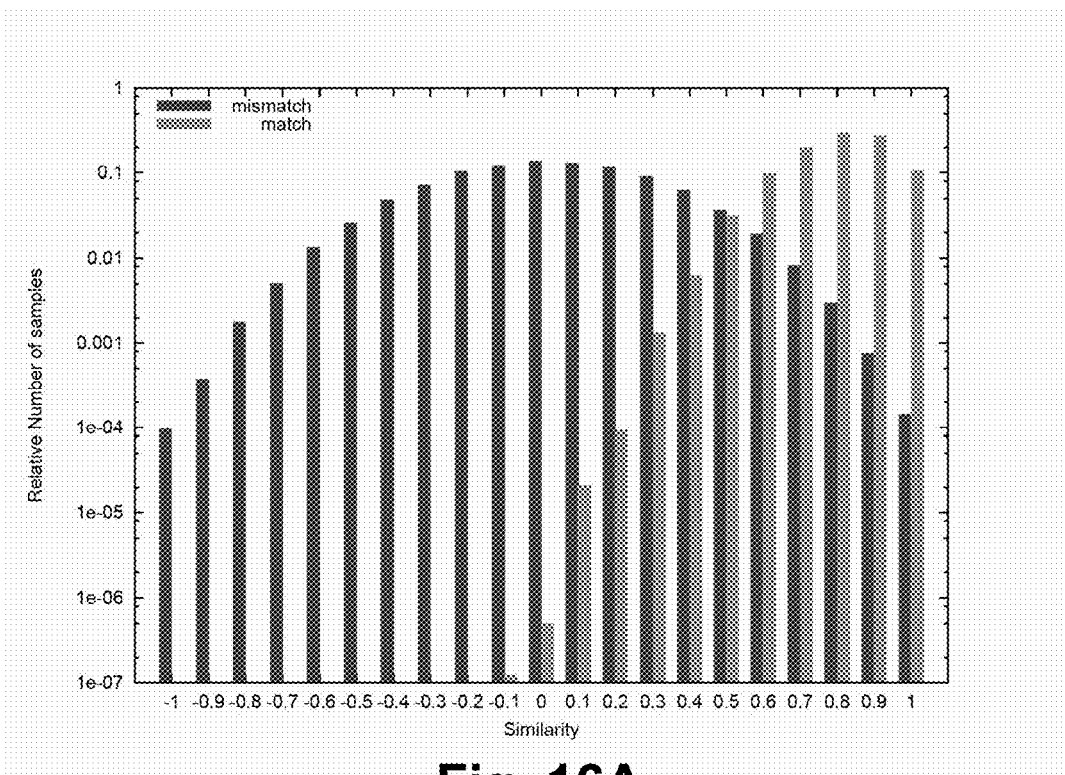
FIGS. 16A and 16B are graphs depicting the similarity distribution for fingerprints of order 10 and 140, respectively, as generated by a method in accordance with an embodiment of the present invention.
Figure 16B:
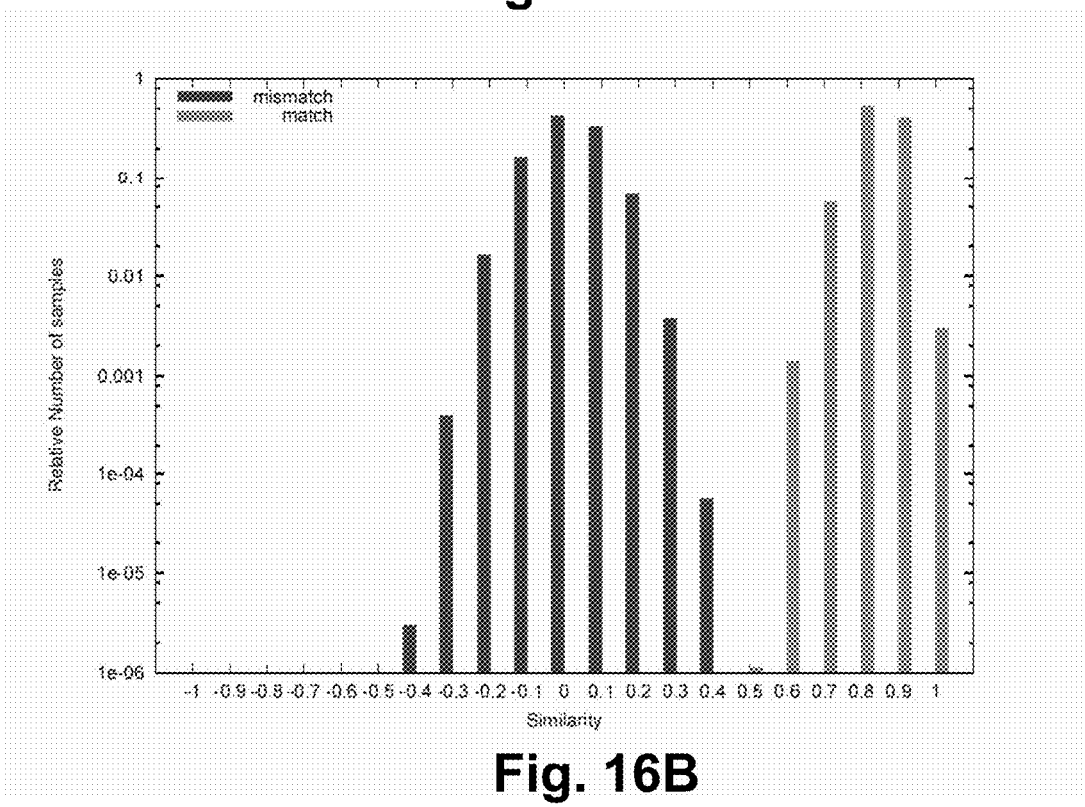

Next the power-up data is sub-sampled for fingerprint lengths n=[10, 20, 30, . . . , 1000]. For each length n 6,400 random selections of n distinct cells were performed. For each power-up bit-string, the power-up values of these n cells were extracted, interpreted as an FID, and the similarity was computed against each of the CIDs of the 32 sample die, using the same n cells. The matching similarities, in which the FID and the CID belong to the same die, are distinguished from the mismatching similarities, in which FID and the CID belong to different die, in the manner illustrated in FIG. 13, for which the actual data are depicted in the graphs of FIGS. 16A and 16B. FIG. 16A shows the similarity distributions of the normalized number of samples with a particular similarity value, for fingerprint length n=10. FIG. 16B shows the similarity distributions for fingerprint length n=140. As can be observed from the absence of any similarity gap in FIG. 16A, fingerprint length n=10 is too small for proper identification under the above-described conditions. However, for n=140 $\max(S_{mismatch}) < \min(S_{match})$, which provides a similarity gap and therefore can provide proper identification of all devices. Furthermore, the distribution for n=140 shown in FIG. 16B has a smaller spread than the distribution for n=10, shown in FIG. 16A, as is expected from the central limit theorem as described above. Nevertheless, the expected values for the matching similarities, $E(S_{match}) \approx 0.85$, and the mismatching similarities, $E(S_{mismatch}) \approx 00$, are already visible for fingerprint lengths n=10. The relatively low expected similarity value for matching fingerprints suggests that a significant fraction of the cells with matching expected power-up values is relatively unstable.

Figure 17A:
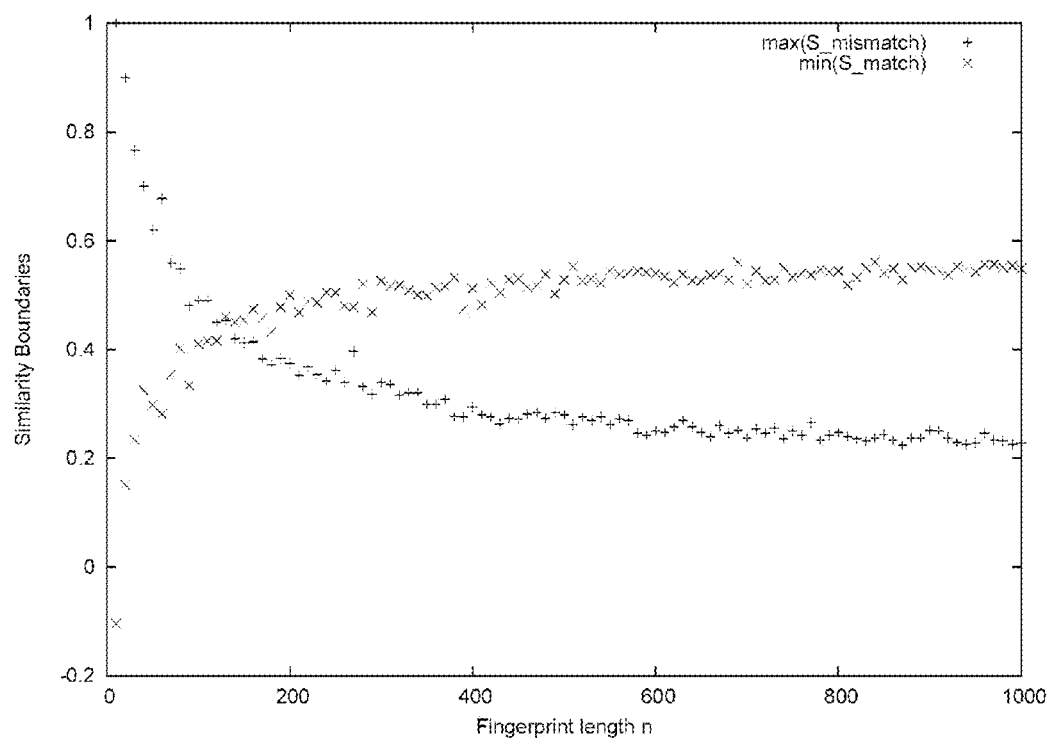
FIG. 17A is graph depicting the similarity bound maximum and minimum versus fingerprint length and FIG. 17B is a graph depicting the similarity gap versus fingerprint length for fingerprints generated by a method in accordance with an embodiment of the present invention from data for a number of power supply voltages and environmental temperatures.
Figure 17B:
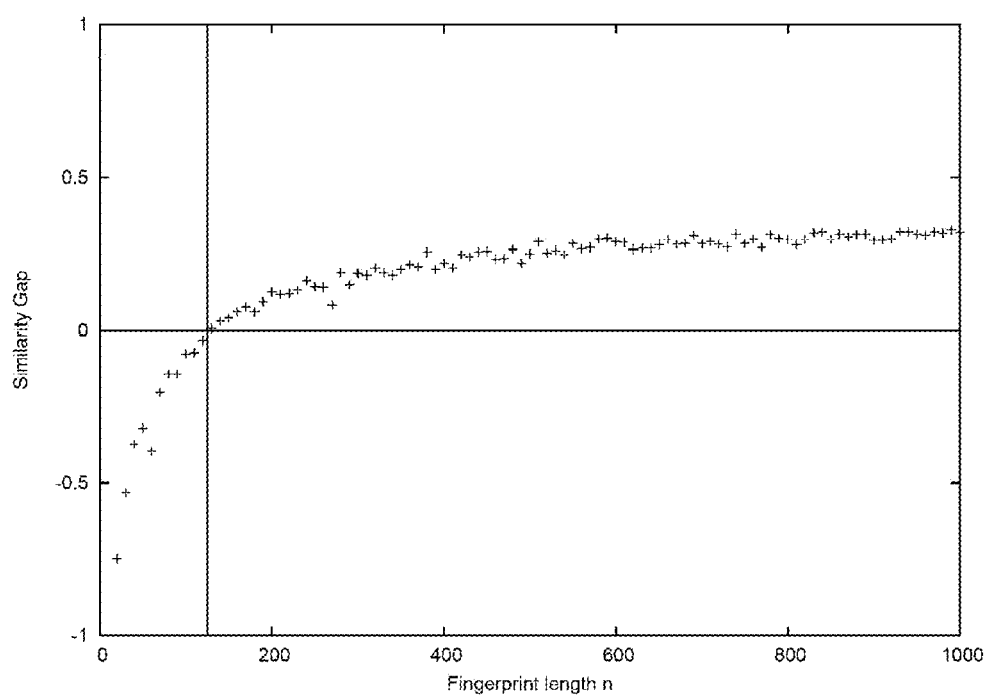

FIG. 17A is a graph showing for fingerprint lengths n that are multiples of 10, the similarity bounds $\max(S_{mismatch})$ (points marked "+") and $\min(S_{match})$ (points marked "x"). FIG. 17B is a graph showing the value of $S_{gap}$ according to Equation 15 above. The graphs of FIG. 17A and FIG. 17B include data from all of the environmental temperature and power supply voltage conditions tested. The value of $S_{gap}$ is negative for n<130 and positive for n≥130. Therefore, in the given example, a fingerprint length of at least n=130 bits is needed to identify the 32 die. To increase the confidence in the fingerprint method, n=200 bits and a threshold of about $T_S$=0.4 is recommended. As disclosed in the section above entitled Birthday Paradox and Fingerprint Length, the particular choice of n and $T_S$ depends on the number of die to be distinguished and the variation in the fabrication process.

Figure 18A:
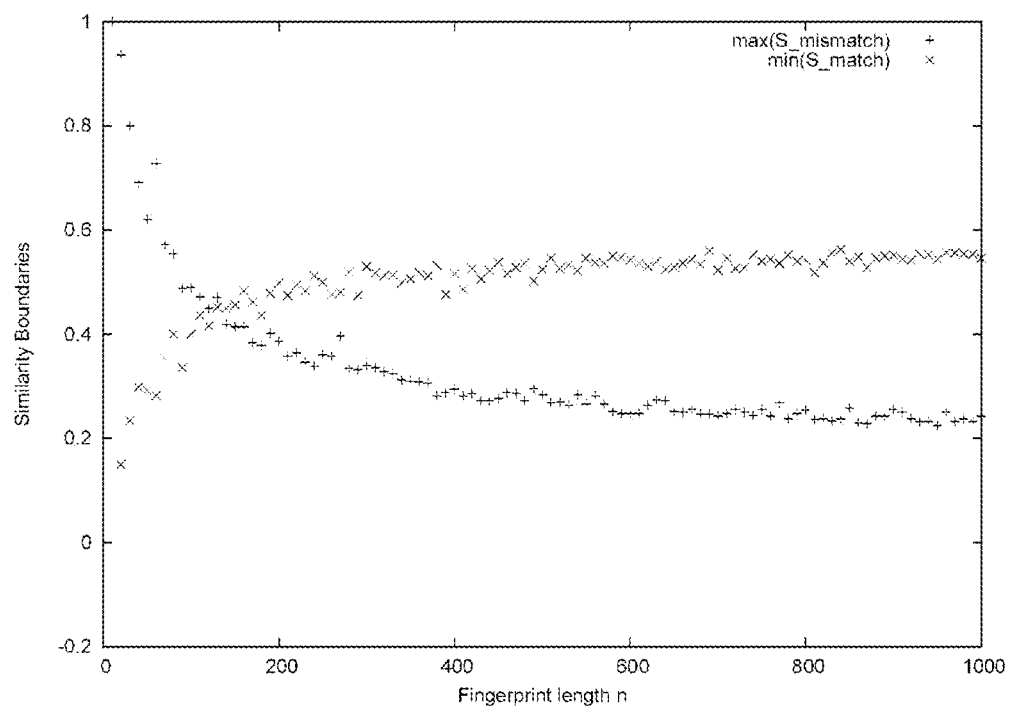
FIG. 18A is graph depicting the similarity bound maximum and minimum versus fingerprint length and FIG. 18B is a graph depicting the similarity gap versus fingerprint length for fingerprints generated by a method in accordance with an embodiment of the present invention from data for a nominal power supply voltage at two temperature extremes.
Figure 18B:
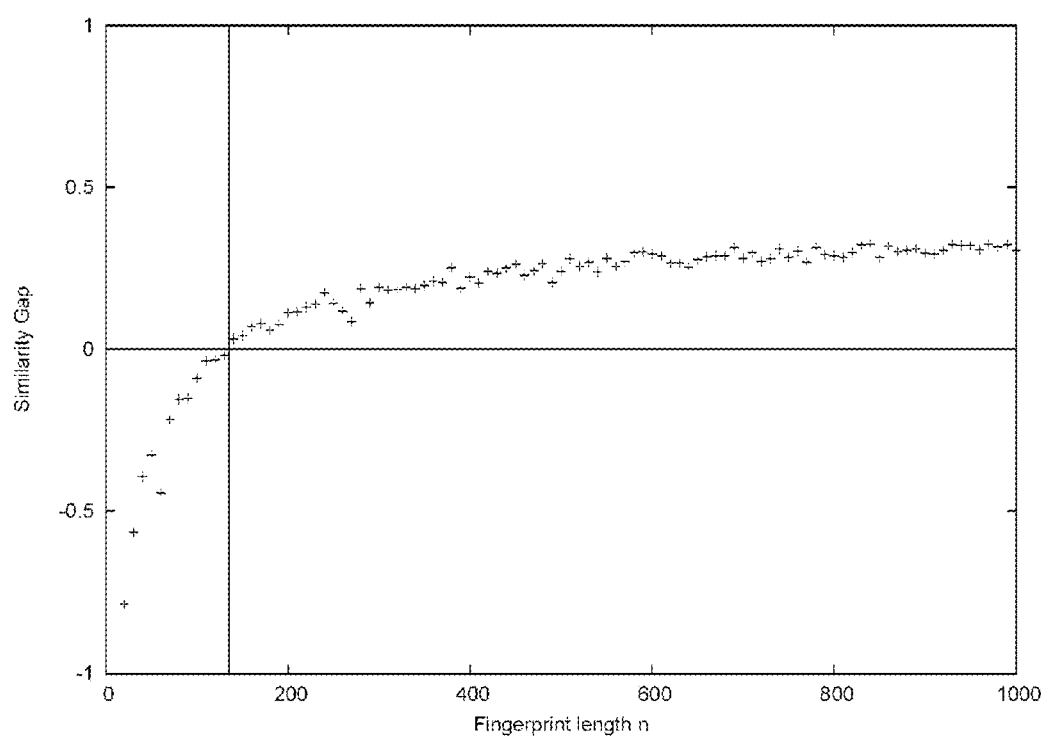

FIGS. 18A and 18B show the similarity bounds the corresponding similarity gap for fingerprints generated from two data sets at conditions (1V, 25° C.) and (1V, 150° C.). For die with incomplete data sets, the bit-strings at the minimum and maximum temperatures available were used. The reduction in temperature conditions required for evaluation and CID generation reduces the experimental characterization effort substantially, from performing at least 20 power-cycle experiments for each of $|V_{dd} \times T|$=36 conditions to just 2 ($V_{dd}$,T)-conditions tested per die. Yet, using just two data sets suffices to detect 83% of all cells with differing power-up values compared to using all of the available data sets. Comparing FIGS. 17A and 17B with FIGS. 18A and 18B, it is noted that the similarity gap becomes positive for n≥140 bits per fingerprint using a fixed power supply voltage and only two temperature conditions as opposed to n≥130 as shown in FIG. 17B. The small shift hardly effects the quality of the identification method, in part because a greater number of bits will generally be used, about n=200 bits per fingerprint, in order to increase the margin of error and to determine a safe similarity threshold $T_S$.

Figure 19:
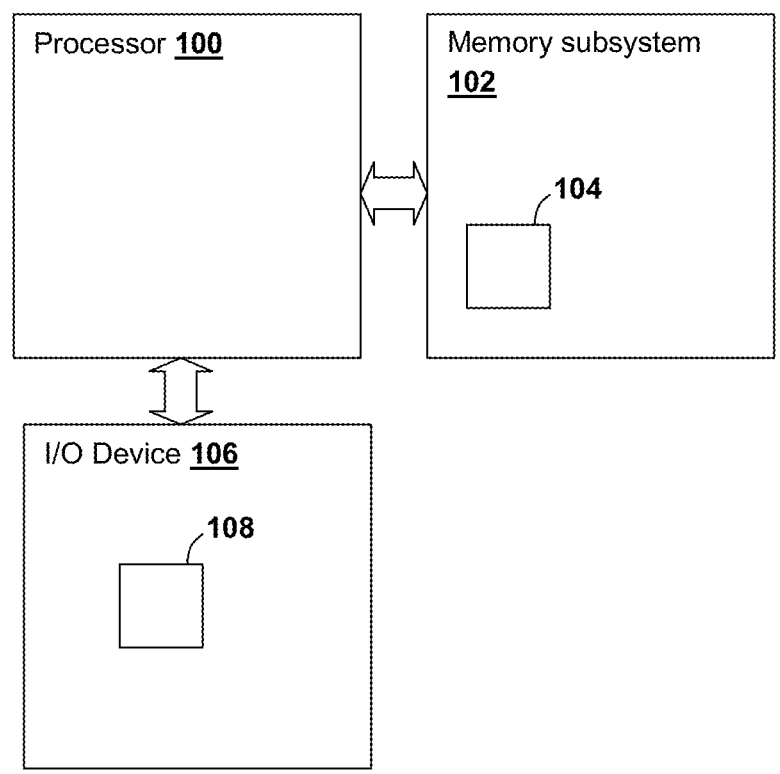
FIG. 19 is a block diagram depicting a system that may be secured by fingerprinting techniques in accordance with an embodiment of the present invention.

Referring now to FIG. 19, an exemplary system that can be secured by the techniques of the present invention is shown. A processor 100 is coupled to a memory subsystem 102 and an I/O device 106. In each of memory subsystem 102 and I/O device 106, static storage cells 104 and 108 are respectively present. For example, static storage cells 104 may be a cache memory and static storage cells 108 may be a collection of latches within I/O device, or a device memory. Static storage cells 104 and 108 can be characterized according to the above-described CID generation method, and an FID extracted by processor 100 upon power-up from storage cells 104 and 108, respectively. Given a repository of CIDs, the extracted FIDs can be used by processor 100 to determine whether or not to halt execution. E.g., if one of memory subsystem 102 and/or I/O device 106 has been replaced with an unauthorized device. The CID repository may be a single CID stored within processor 100 for each subsystem being authenticated, if absolute authentication of a single device for each subsystem is needed. The system of FIG. 19 is only one example of a configuration illustrating a variety of types of storage cells and devices that may be identified by a processor in order to maintain system integrity, or make other decisions based on the particular devices identified by processor 100.

Figure 20:
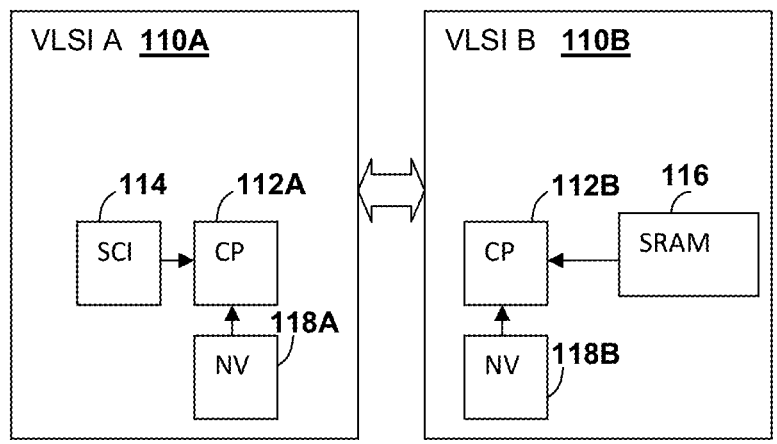
FIG. 20 is a block diagram depicting a system that may be secured by fingerprinting techniques in accordance with another embodiment of the present invention.

Referring now to FIG. 20, another exemplary system that can be secured by the techniques of the present invention is shown. A first VLSI device 110A is coupled to another VLSI device 110B. Each of VLSI devices 110A and 110B include different forms of static storage cells, provided for generality of illustration. In VLSI device 110A, latches forming logic circuits (not shown) are read by a scan chain interface 114 at power-up to generate an FID, and in VLSI device 110B, an internal SRAM 116 is used to generate an FID. A cryptographic processor 112A, 112B in each of VLSI devices 110A and 110B, uses the FIDs as private keys, which are combined with information stored in a corresponding non-volatile memory 118A, 118B to generate messages that are exchanged by VLSI devices 110A and 110B. The information stored in non-volatile memory 118A, 118B can be based upon a repository of CIDs or a single CID as mentioned above, so that VLSI devices 110A and 110B can each verify that they are connected to an authentic device. While the illustrated embodiment provides two-way authentication and cryptographic security for exemplary illustration, it is understood that non-cryptographic authentication and/or one-way authentication can be provided between two or more VLSI devices.

Figure 21:
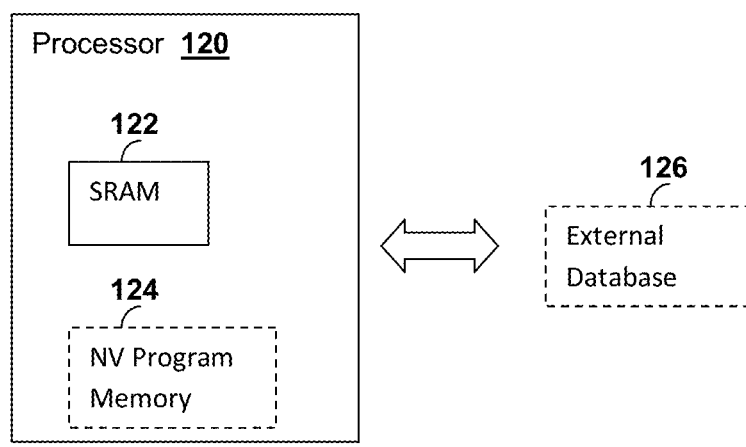
FIG. 21 is a block diagram depicting a processor that may be secured by fingerprinting techniques in accordance with an embodiment of the present invention.

Referring now to FIG. 21, an exemplary processor 120 that can be secured by the techniques of the present invention is shown. Processor 120 includes an SRAM 122, e.g., an L1 cache that can be read at power-up to determine initial cell states. An FID generated from the initial states can be similarity matched by processor 120 against a value stored in a non-volatile program memory 124 or processor 120 may access an external database 126 (e.g., via a public or private network connection) to determine whether the FID matches one or more known CIDs. The processor illustrated in FIG. 21 can then self-authenticate to determine whether to execute, making it possible to protect otherwise obtainable program code by tying it to a specific die or group of dies.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for authenticating an electronic device as being a particular electronic device, wherein the electronic device contains a number of static storage elements, and wherein the method comprises:
    applying power to the electronic device;
    reading initial values of the static storage elements after applying power to collect a set of power-up states; and
    comparing the initial values with an identifier corresponding to the particular electronic device, wherein the identifier encodes an expected value of a set of static storage elements within the particular device and probabilities that the static storage elements will assume their corresponding expected values, and wherein the comparing applies both the expected value of the set of static storage elements and probabilities that the static storage elements will assume their corresponding expected values.

2. The method of claim 1, wherein the comparing further comprises:
    for the static storage elements of the particular electronic device that have an expected value that matches the initial value of the corresponding static storage elements in the electronic device, adding the corresponding probability to a total;

for the static storage elements of the particular electronic device that have an expected value that does not match the initial value of the corresponding static storage elements in the electronic device, subtracting the corresponding probability from a total; and comparing the total to a threshold value to determine if a match between the initial values and the identifier is sufficient.

3. The method of claim 2, further comprising dividing the total by a number of static storage elements included in the comparing.

4. A computer system comprising:

a processor for executing program instructions; and a memory coupled to the processor for storing the program instructions, wherein the program instructions comprise program instructions for authenticating an electronic device as being a particular electronic device, wherein the electronic device contains a number of static storage elements, wherein the program instructions comprise program instructions for, reading initial values of the static storage elements after power has been applied to the electronic device to collect a set of power-up states, and comparing the initial values with an identifier corresponding to the particular electronic device, wherein the identifier encodes an expected value of a set of static storage elements within the particular device and probabilities that the static storage elements will assume their corresponding expected values, and wherein the comparing applies both the expected value of the set of static storage elements and probabilities that the static storage elements will assume their corresponding expected values.

5. The computer system of claim 4, wherein the program instructions for comparing further comprise program instructions for:

for the static storage elements of the particular electronic device that have an expected value that matches the initial value of the corresponding static storage elements in the electronic device, adding the corresponding probability to a total;

for the static storage elements of the particular electronic device that have an expected value that does not match the initial value of the corresponding static storage elements in the electronic device, subtracting the corresponding probability from a total; and comparing the total to a threshold value to determine if a match between the initial values and the identifier is sufficient.

6. The computer system of claim 5, wherein the program instructions further comprise program instructions for dividing the total by a number of static storage elements included in the comparing.

7. A computer program product comprising a non-transitory computer-readable storage device storing program instructions for execution by a processing system, wherein the program instructions comprise program instructions for authenticating an electronic device as being a particular electronic device, wherein the electronic device contains a number of static storage elements, wherein the program instructions comprise program instructions for:

reading initial values of the static storage elements after power has been applied to the electronic device to collect a set of power-up states; and comparing the initial values with an identifier corresponding to the particular electronic device, wherein the identifier encodes an expected value of a set of static storage elements within the particular device and probabilities that the static storage elements will assume their corresponding expected values, and wherein the comparing applies both the expected value of the set of static storage elements and probabilities that the static storage elements will assume their corresponding expected values.

8. The computer program product of claim 7, wherein the program instructions for comparing further comprise program instructions for:

for the static storage elements of the particular electronic device that have an expected value that matches the initial value of the corresponding static storage elements in the electronic device, adding the corresponding probability to a total;

for the static storage elements of the particular electronic device that have an expected value that does not match the initial value of the corresponding static storage elements in the electronic device, subtracting the corresponding probability from a total; and comparing the total to a threshold value to determine if a match between the initial values and the identifier is sufficient.

9. The computer program product of claim 8, further comprising program instructions for dividing the total by a number of static storage elements included in the comparing.

* * * * *